(12) United States Patent
Tsuchiya

(10) Patent No.: US 10,972,664 B2
(45) Date of Patent: Apr. 6, 2021

(54) IMAGE BLURRING CORRECTION APPARATUS, IMAGING APPARATUS, AND IMAGE BLURRING CORRECTION METHOD THAT CORRECTS IMAGE BLURRING BASED ON PANNING DETECTION AND ANGULAR VELOCITY

(71) Applicant: OLYMPUS CORPORATION, Hachioji (JP)

(72) Inventor: Hitoshi Tsuchiya, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 228 days.

(21) Appl. No.: 16/010,735

(22) Filed: Jun. 18, 2018

(65) Prior Publication Data

US 2019/0007616 A1    Jan. 3, 2019

(30) Foreign Application Priority Data

Jun. 29, 2017   (JP) .............................. JP2017-126902

(51) Int. Cl.
*H04N 5/232*    (2006.01)
*G02B 27/64*    (2006.01)
*G01P 3/00*    (2006.01)

(52) U.S. Cl.
CPC ....... *H04N 5/23258* (2013.01); *G02B 27/646* (2013.01); *H04N 5/23287* (2013.01);
(Continued)

(58) Field of Classification Search
CPC ........... G01P 3/00; G03B 17/14; G03B 15/00; G03B 5/00; G03B 2206/00;
(Continued)

(56) References Cited

U.S. PATENT DOCUMENTS 5,761,545 A *  6/1998  Tanaka ...................... G03B 5/00
                                                348/E5.046
6,630,950 B1 * 10/2003  Ohkawara .......... H04N 5/23248
                                                348/208.11
(Continued)

FOREIGN PATENT DOCUMENTS

JP    H05-216104 A    8/1993
JP    2012-168420 A    9/2012
(Continued)

*Primary Examiner* — Twyler L Haskins
*Assistant Examiner* — Akshay Trehan
(74) *Attorney, Agent, or Firm* — Volpe Koenig

(57) ABSTRACT

An image blurring correction apparatus includes: an angular-velocity sensor that detects an angular velocity; and a processor. The processor includes: a first-panning detection section that detects first panning on the basis of the angular velocity; a LPF processing section that performs LPF processing on the angular velocity; a second-panning detection section that detects second panning that has a panning velocity that is lower than that of the first panning on the basis of a processing result of the LPF processing section; a HPF processing section that performs HPF processing on the angular velocity; a calculation section that calculates an image-blurring-correction amount on the basis of a detection result of the first-panning detection section or a detection result of the second-panning detection section, and a processing result of the HPF processing section; and a drive circuit that drives an image-blurring-correction mechanism on the basis of the image-blurring-correction amount.

23 Claims, 14 Drawing Sheets

(52) U.S. Cl.
CPC ........ *G01P 3/00* (2013.01); *G03B 2205/0007* (2013.01); *G03B 2217/005* (2013.01)

(58) Field of Classification Search
CPC ......... G03B 2217/005; H04N 5/23258; H04N 5/23287; H04N 5/23209; H04N 5/23212; H04N 5/23251; H04N 5/23254; H04N 5/2329; H04N 5/23248; H04N 5/23261; H04N 5/23267; H04N 5/2327; H04N 5/23296; H04N 2101/00; H04N 101/00
See application file for complete search history.

(56) References Cited

U.S. PATENT DOCUMENTS

| | | | | |
|---|---|---|---|---|
| 2012/0207457 A1* | 8/2012 | Miyasako | ................ | G03B 5/00 396/55 |
| 2016/0261784 A1* | 9/2016 | Mukunashi | ........ | H04N 5/23258 |
| 2017/0251146 A1* | 8/2017 | Ikeda | ................ | H04N 5/23209 |

FOREIGN PATENT DOCUMENTS

| | | | | |
|---|---|---|---|---|
| JP | 2013-078104 A | | 4/2013 | |
| JP | 2013078104 A | * | 4/2013 | ............... G03B 5/00 |

\* cited by examiner

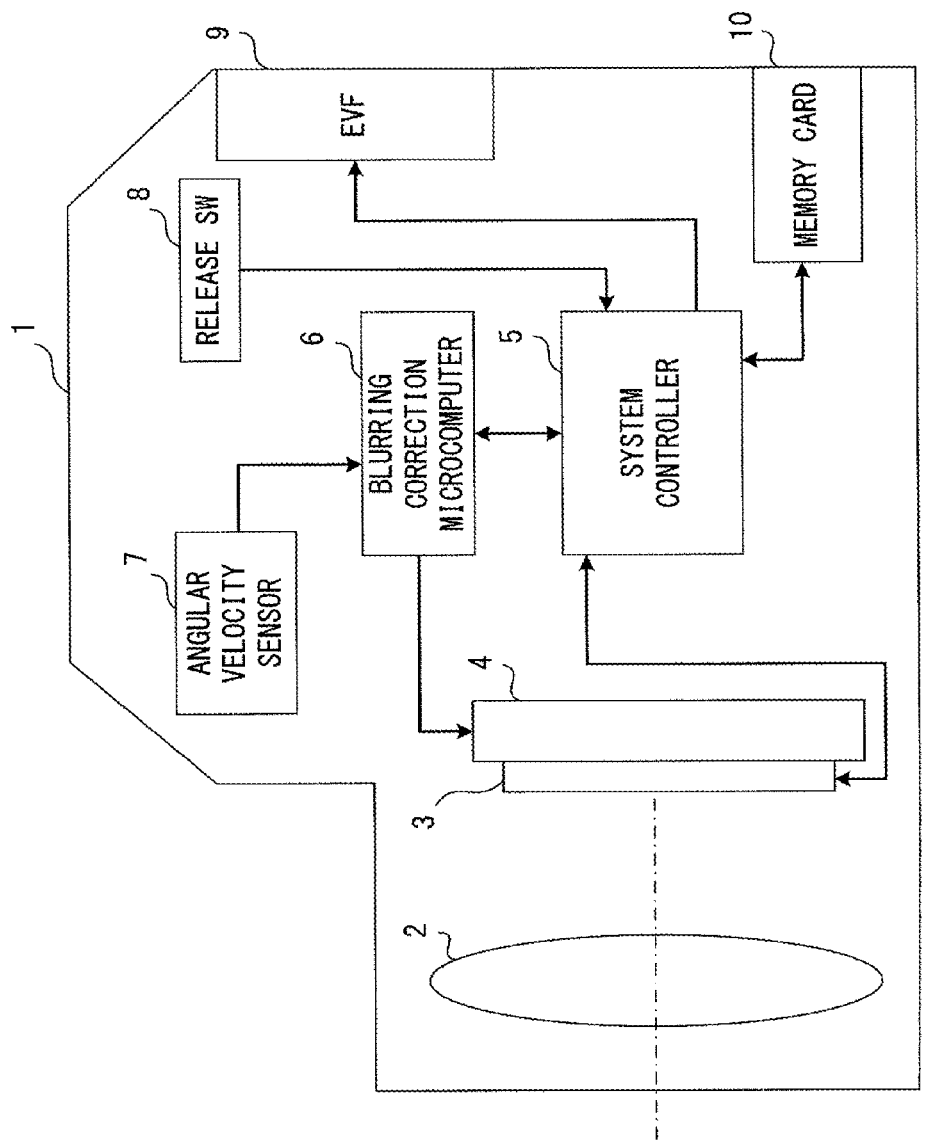
F I G. 1

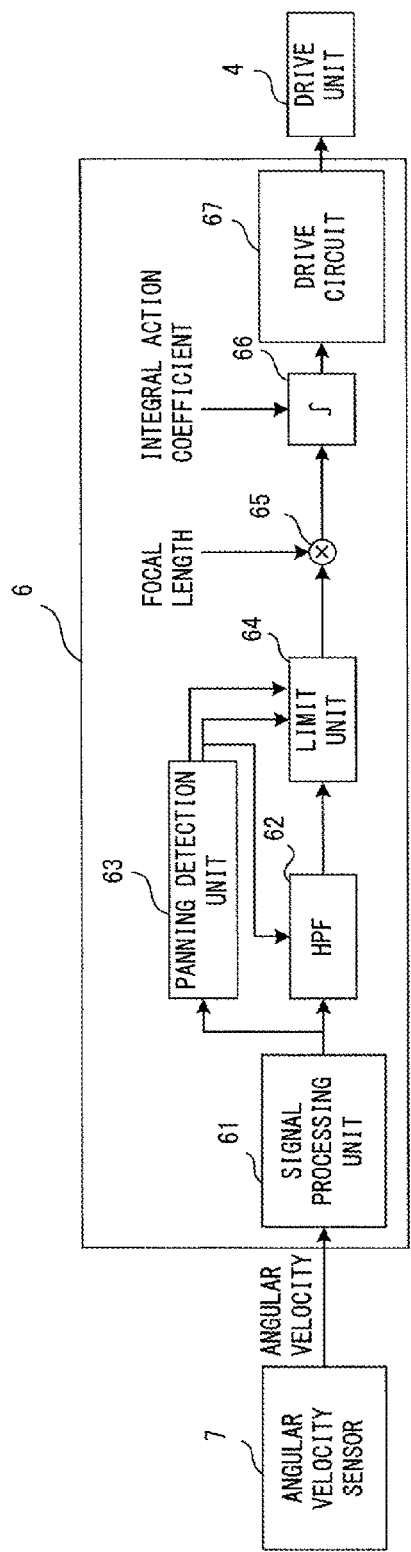
F I G. 2

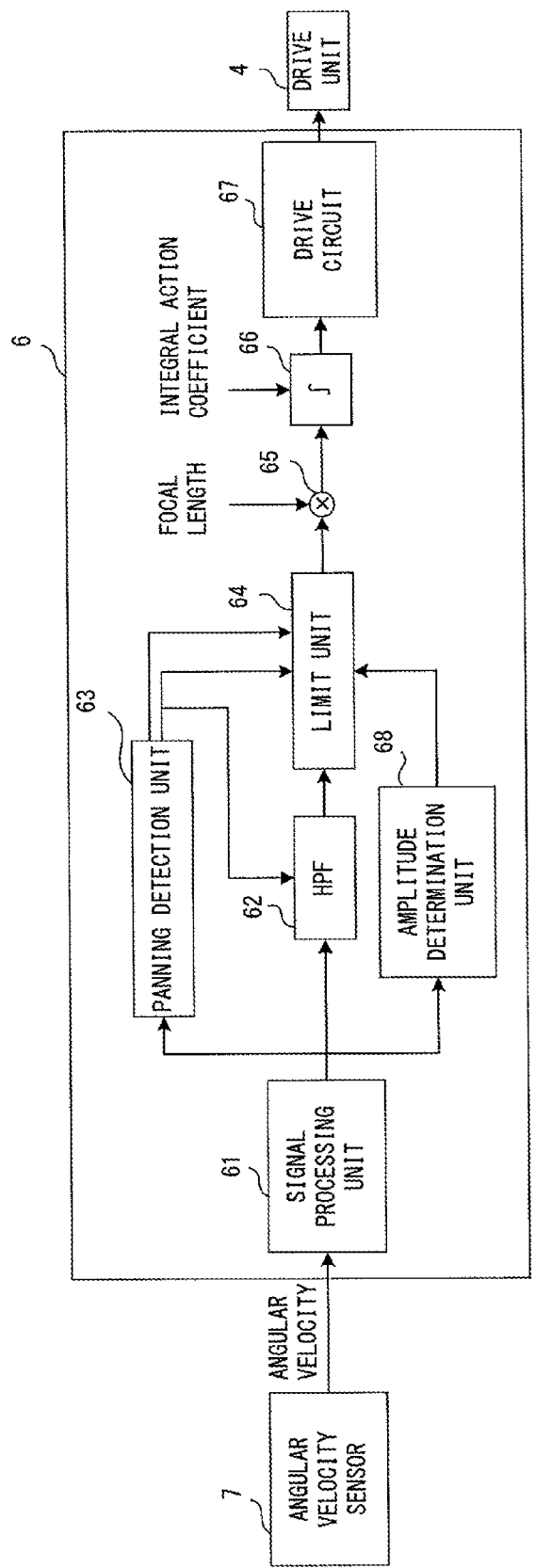
F I G. 8

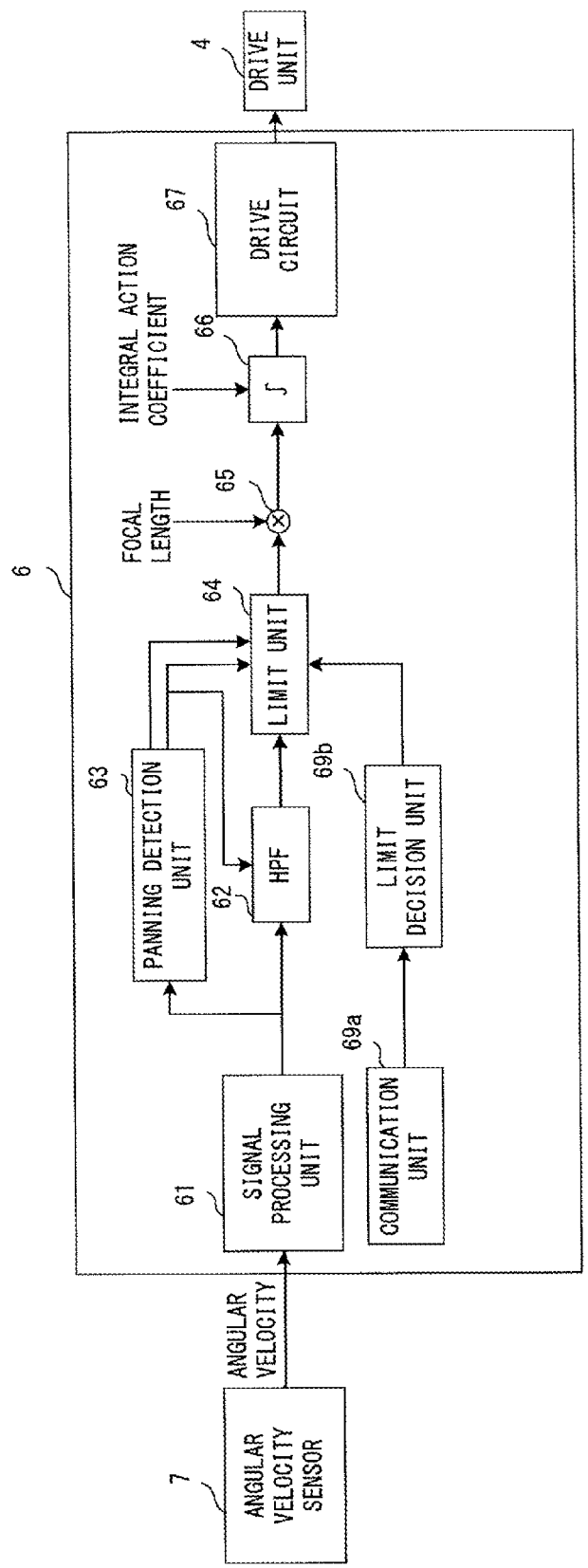
F I G. 11

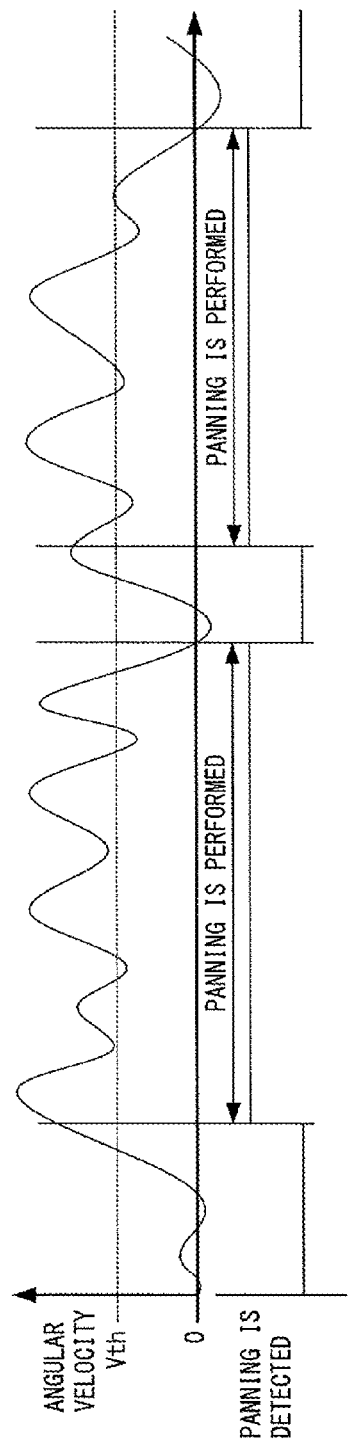

IMAGE BLURRING CORRECTION APPARATUS, IMAGING APPARATUS, AND IMAGE BLURRING CORRECTION METHOD THAT CORRECTS IMAGE BLURRING BASED ON PANNING DETECTION AND ANGULAR VELOCITY

CROSS-REFERENCE TO RELATED APPLICATIONS

This application is based upon and claims the benefit of priority of the prior Japanese Patent Application No. 2017-126902, filed on Jun. 29, 2017, the entire contents of which are incorporated herein by reference.

FIELD

The present invention relates to an image blurring correction apparatus that corrects image blurring, an imaging apparatus provided with the image blurring correction apparatus, and an image blurring correction method for the image blurring correction apparatus.

BACKGROUND

Common digital cameras (hereinafter simply referred to as cameras) of recent years include one that performs an optical shake correction during recording of a moving image or that applies such a correction to a finder view. The finder view means a video image of a subject captured and displayed (displayed in a finder) in real time during, for example, a standby mode in image shooting, and is also referred to as a live view.

Making a shake correction of continuous video images in a finder view during video filming prevents the images from being blurred due to camera shakes, and hence the images give no visual feeling of wrongness.

A photographer's intentional actions include, for example, swinging a camera rightward or leftward (horizontal direction), upward or downward (vertical direction), or diagonally. In a broad sense, all of these types of camera work are referred to as panning; in a more limited sense, an action of swinging the camera rightward or leftward is referred to as panning, and an action of swinging the camera upward or downward is referred to as tilting. Unless otherwise noted, panning herein refers to the panning in the broad sense.

FIGS. 12 and 13 each depict an exemplary temporal variation in an angular velocity of a camera detected when panning is performed (see the upper side of the figure), and an exemplary temporal variation in the amount of movement of a video image captured by the camera (the quantity of image movement vector) in that situation (see the lower side of the figure). In the upper side of each figure, a solid line indicates a detected angular velocity (the angular velocity of the camera), and a broken line indicates an angular velocity after performing high-pass filter (HPF) processing based on a HPF (a process for removing low frequency components) on the detected angular velocity (an angular velocity after the HPF process). In the lower side of each figure, a solid line indicates the amount of image movement in the absence of a shake correction, and a broken line indicates the amount of image movement in the presence of a shake correction.

In recent years, high-picture-quality video filming can be easily performed, and even average users have started using their camera work as a means for providing elaborate images.

For example, an image may be shot by performing panning at a low angular velocity so as to enter/exclude a main subject into/from the view.

FIG. 14 depicts an exemplary temporal change in an angular velocity of a camera detected when slow panning is performed (see the upper side of the figure), and an example of panning of the camera detected in that situation (see the lower side of the figure). In FIG. 14, Vth indicates a threshold used to detect panning.

There have already been various proposals regarding the matters described above.

An imaging apparatus described in patent document 1 (Japanese Laid-open Patent Publication No. 2012-168420) performs, for example, the following processes: an angular velocity sensor detects shake applied to the imaging apparatus; a HPF calculation unit attenuates low frequency components in the output of the angular velocity sensor; an image blurring compensation amount is calculated on the basis of that output, and image blurring compensation is executed by drive control of the compensation optical system; for each sampling period, an intermediate value is retained as a calculation result by a digital high pass filter that configures the HPF calculation unit; when a panning control unit that detects a panning operation performed by the imaging apparatus detects the completion of the panning operation, the intermediate value retained in the digital high pass filter is initialized by the panning control unit, and the output of the HPF calculation unit is placed to approximately a value of zero. The imaging apparatus initializes the intermediate values and places the output of the HPF calculation unit to approximately a value of zero, thereby decreasing a feeling of wrongness that the photographer could have when panning is finished.

An imaging apparatus described in patent document 2 (Japanese Laid-open Patent Publication No. 2013-78104) has been proposed as an apparatus that makes a shake correction when panning is performed. The imaging apparatus includes a sensor that detects a shake amount, a movable part for shake correction, and a signal processing apparatus. The signal processing apparatus generates a signal representing a target position for the movable member for shake correction on the basis of a detection signal of the sensor, and has a variable cut-off frequency. The signal processing apparatus includes a highpass filter that applies highpass filter processing to the detection signal of the sensor, and a cut-off-frequency control unit. The cut-off-frequency control unit makes the cut-off frequency higher when the level of a value of integral of the detection signal of the sensor exceeds a predetermined threshold, and sets the cut-off frequency back to the original when the level becomes equal to or less than the threshold. Providing such a signal processing apparatus enables panning and tilting to be appropriately accommodated.

A pan shooting device described in patent document 3 (Japanese Laid-open Patent Publication No. 5-216104) has been proposed as an apparatus for determining whether panning is being performed. The pan shooting device includes: a camera shake detecting means for detecting a camera shake and outputting a camera shake signal; a correction optical system for correcting the camera shake; a correction driving unit for driving the correction optical system on the basis of the camera shake signal from the camera shake detecting means; a pan shooting determination means; and a switching means. The pan shooting determination means determines whether pan shooting is being performed, by eliminating high frequency components from the camera shake signal from the camera shake detecting means. When the pan shooting determination means has determined that pan shooting is being performed, the switching means stops the camera shake signal being transmitted to the correction driving unit. Such a configuration enables it to be automatically determined that pan shooting has been started, so that pan shooting can be performed without making an advance preparation.

SUMMARY

An aspect of the present invention provides an image blurring correction apparatus that includes: an angular-velocity detection sensor that detects an angular velocity of an apparatus; and a processor, wherein the processor includes: a first-panning detection section that detects first panning on the basis of the angular velocity; a low-pass-filter (LPF) processing section that performs LPF processing on the angular velocity; a second-panning detection section that detects second panning that has a panning velocity that is lower than that of the first panning on the basis of a processing result of the LPF processing section; a high-pass-filter (HPF) processing section that performs HPF processing on the angular velocity; a calculation section that calculates an image-blurring-correction amount on the basis of a detection result of the first-panning detection section or a detection result of the second-panning detection section, and the processing result of the HPF processing section; and a drive circuit that drives an image-blurring-correction mechanism on the basis of the image-blurring-correction amount, wherein when the first-panning detection section has detected the first panning, or when the second-panning detection section has detected the second panning, the processor changes one of, or both, a characteristic of the HPF processing section and a characteristic of the calculation section in such a manner as to decrease the image-blurring-correction amount.

Still another aspect of the invention provides an imaging apparatus that includes the image blurring correction apparatus in accordance with the aspect described above.

Yet another aspect of the invention provides an image blurring correction method for an image blurring correction apparatus, the image blurring correction method including: detecting an angular velocity of an apparatus; detecting first panning on the basis of the angular velocity; performing low-pass-filter (LPF) processing on the angular velocity; detecting second panning that has a panning velocity that is lower than that of the first panning on the basis of a processing result of the LPF processing; performing high-pass-filter (HPF) processing on the angular velocity; calculating an image-blurring-correction amount on the basis of a result of the detection of the first panning or a result of the detection of the second panning, and a processing result of the HPF processing; and driving an image-blurring-correction mechanism on the basis of the image-blurring-correction amount, wherein when the first panning has been detected, or when the second panning has been detected, one of, or both, a characteristic of the HPF processing and a characteristic of the calculating of the image-blurring-correction amount is changed in such a manner as to decrease the image-blurring-correction amount.

A further aspect of the invention provides an image blurring correction apparatus that includes: an angular-velocity sensor that detects an angular velocity of an apparatus; and a processor, wherein the processor includes: a panning detection section that detects panning on the basis of the angular velocity; a high-pass-filter (HPF) processing section that performs HPF processing on the angular velocity; a limit section that performs clip processing on a processing result of the HPF processing section on the basis of a detection result of the panning detection section; a calculation section that calculates an image-blurring-correction amount on the basis of a processing result of the limit section; and a drive circuit that drives an image-blurring-correction mechanism on the basis of the image-blurring-correction amount, wherein when the panning detection section has detected the panning, the limit section performs the clip processing under a condition in which a threshold that has a sign that corresponds to an opposite direction from the direction of the panning is defined as a limit value for the processing result of the HPF processing section, and when the panning detection section has detected an end of the panning, the processor initializes the HPF processing section.

Still further aspect of the invention provides an imaging apparatus that includes the image blurring correction apparatus in accordance with the aspect described above.

Yet further aspect of the invention provides an image blurring correction apparatus that includes: an angular-velocity sensor that detects an angular velocity of an apparatus; and a processor, wherein the processor includes: a panning detection section that detects panning on the basis of the angular velocity; a high-pass-filter (HPF) processing section that performs HPF processing on the angular velocity; a decision section that decides an upper limit value and a lower limit value for a processing result of the HPF processing section; a limit section that performs clip processing on a processing result of the HPF processing section on the basis of a detection result of the panning detection section, the upper limit value, and the lower limit value; a calculation section that calculates an image-blurring-correction amount on the basis of a processing result of the limit section; and a drive circuit that drives an image-blurring-correction mechanism on the basis of the image-blurring-correction amount, wherein when the panning detection section has not detected the panning, the limit section performs the clip processing using the upper limit value and the lower limit value.

Yet further aspect of the invention provides an imaging apparatus that includes the image blurring correction apparatus in accordance with the aspect described above.

BRIEF DESCRIPTION OF DRAWINGS

FIG. 1 illustrates an exemplary configuration of a camera that is an imaging apparatus that includes an image blurring correction apparatus in accordance with a first embodiment;

FIG. 2 illustrates an exemplary functional configuration of a blurring correction microcomputer in accordance with a first embodiment;

FIG. 8 illustrates an exemplary functional configuration of a blurring correction microcomputer in accordance with a third embodiment;

FIG. 11 illustrates an exemplary functional configuration of a blurring correction microcomputer in accordance with a fifth embodiment;

FIG. 14 illustrates an exemplary situation in which a camera erroneously detects an end of panning when a panning determination has been made using a conventional technique.

DESCRIPTION OF EMBODIMENTS

Figure 3:
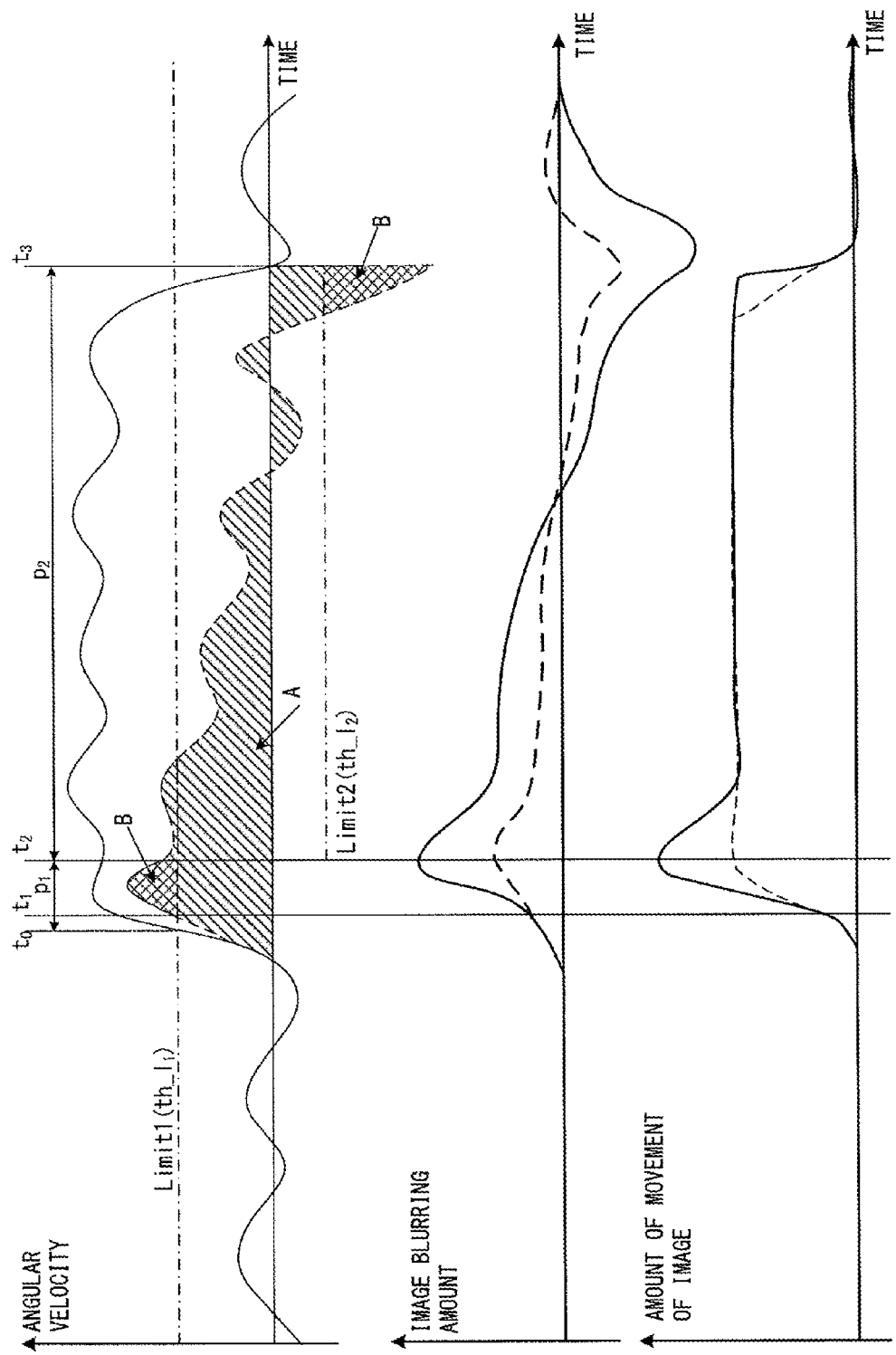
FIG. 3 illustrates exemplary effects of a blurring correction microcomputer in accordance with a first embodiment that are achieved when panning has been performed.

The following describes embodiments of the present invention by referring to the drawings.

First Embodiment

FIG. 1 illustrates an exemplary configuration of a camera that is an imaging apparatus that includes an image blurring correction apparatus in accordance with a first embodiment of the invention.

As depicted in FIG. 1, a camera 1 includes an image shooting optical system 2, an image pickup element 3, a drive unit 4, a system controller 5, a blurring correction microcomputer 6, an angular velocity sensor 7, a release switch (SW) 8, an electric viewfinder (EVF) 9, and a memory card 10.

The image shooting optical system 2 includes a focus lens and a zoom lens and forms an optical image of a subject on the image pickup element 3.

The image pickup element 3 converts an image (optical image) of a subject formed by the image shooting optical system 2 into an electrical signal. The image pickup element 3 is an image sensor, e.g., a charge coupled device (CCD), a complementary metal oxide semiconductor (CMOS).

The system controller 5 controls operations of the entirety of the camera 1. For example, the system controller 5 may read, as a video image signal, an electrical signal obtained via the converting performed by the image pickup element 3, apply predetermined image processing to the signal, and then display the signal as a video image (live view, finder view) on the EVF 9 or record the signal in the memory card 10 as a record image. The memory card 10 is a nonvolatile memory attachable to, and detachable from, the camera 1 and is, for example, SD memory card®.

The angular velocity sensor 7 detects angular velocities in a yaw direction and a pitch direction such that two axes orthogonal to an optical axis of the image shooting optical system 2 are defined as rotation axes. These two axis are also a vertical axis and a horizontal axis of the camera 1.

On the basis of the angular velocity detected by the angular velocity sensor 7, the blurring correction microcomputer 6 calculates the amount of image blurring generated on an image plane (imaging plane of the image pickup element 3) and detects a posture state of the camera 1. Details of the blurring correction microcomputer 6 will be described hereinafter by referring to FIG. 2.

The drive unit 4 is a drive mechanism that holds or moves the image pickup element 3 onto a plane orthogonal to an optical axis of the image shooting optical system 2. The drive unit 4 is provided with a motor such as a voice coil motor (VCM) and moves the image pickup element 3 using a driving force generated by the motor. On the basis of an instruction (driving signal) from the blurring correction microcomputer 6, the drive unit 4 moves the image pickup element 3 in a direction such that the image blurring generated on the image plane is eliminated. This corrects the image blurring generated on the image plane.

The release SW 8 is a switch for reporting a photographer's operation of image shooting to the system controller 5; when the photographer presses the release SW 8, the system controller 5 starts or ends the recording of a moving image or starts the shooting of a static image. Although not illustrated, the camera 1 includes an operation unit for performing another instruction operation of the camera 1, in addition to the release SW 8.

The EVF 9 displays a video image of a subject so as to allow the photographer to visually check a framing state, or displays a menu screen so as to display camera settings.

In the camera 1 which has such a configuration, the system controller 5 and the blurring correction microcomputer 6 each include a processor (e.g., CPU), a memory, and an electronic circuit. The functions of the system controller 5 and the blurring correction microcomputer 6 are each achieved by the processor executing a program stored in the memory. Alternatively, the system controller 5 and the blurring correction microcomputer 6 may each comprise a dedicated circuit, e.g., an application specific integrated circuit (ASIC) or a field-programmable gate array (FPGA).

FIG. 2 illustrates an exemplary functional configuration of the blurring correction microcomputer 6.

The blurring correction microcomputer 6 includes a functional configuration for processing an angular velocity detected for a yaw direction by the angular velocity sensor 7, and a functional configuration for processing an angular velocity detected for a pitch direction by the angular velocity sensor 7. However, those configurations are similar to one another, and FIG. 2 depicts only one of them with the other omitted. Descriptions are given herein of the one configuration only, and descriptions of the other are omitted.

As depicted in FIG. 2, the blurring correction microcomputer 6 includes a signal processing unit 61, a HPF 62, a panning detection unit 63, a limit unit 64, a multiplication unit 65, an integration unit 66, and a drive circuit 67.

The signal processing unit 61 converts an angular velocity output as an analog signal from the angular velocity sensor 7 into a digital value, and subtracts a reference value from the conversion result. The reference value is obtained by converting into a digital value an angular velocity output as an analog signal from the angular velocity sensor 7 when the camera 1 is in a static state. Through such processing, a signed digital value is obtained. In this example, the sign indicates a direction (rotation direction) of an angular velocity, and the absolute value of a signed digital value indicates the magnitude of an angular velocity.

When the angular velocity sensor 7 includes a component that outputs a detected angular velocity as a digital signal, the signal processing unit 61 does not perform a process of converting an analog signal into a digital signal. In this case, the reference value is the value of an angular velocity output as a digital signal from the angular velocity sensor 7 when the camera 1 is in a static state.

The HPF 62 performs a process for removing low frequency components (HPF processing) from an angular velocity that is a processing result of the signal processing unit 61. The HPF is initialized when the panning detection unit 63 has detected an end of panning.

On the basis of the processing result of the signal processing unit 61, the panning detection unit 63 detects panning and a panning direction. More particularly, the panning detection unit 63 detects a start of panning when (1) the absolute value of an angular velocity that is a processing result of the signal processing unit 61 has exceeded a predetermined threshold and (2) the state of (1) has continued for a predetermined period. (3) After this, the panning detection unit 63 detects an end of the panning when the angular velocity that is the processing result of the signal processing unit 61 has crossed zero (zero cross). The panning detection unit 63 also detects, as a direction of the panning, a sign of the angular velocity, i.e., the processing result of the signal processing unit 61, that is indicated at a time at which the start of the panning is detected. The panning detection unit 63 is achieved by, for example, the functional configuration depicted in FIG. 6 which will be described hereinafter with reference to a second embodiment.

On the basis of a detection result of the panning detection unit 63, the limit unit 64 performs clip processing on an angular velocity that is a processing result of the HPF 62. Details of the clip processing will be described hereinafter with reference to FIGS. 3 and 4.

The multiplication unit 65 multiplies an angular velocity that is a processing result of the limit unit 64 by a focal length of the image shooting optical system 2. This converts the angular velocity that is a processing result of the limit unit 64 into the amount of movement of an image on an image plane. Information related to the focal length of the image shooting optical system 2 is reported from, for example, the system controller 5.

The integration unit 66 integrates multiplication results of the multiplication unit 65 (cumulative addition) using an integral action coefficient and outputs the integration result as an image-blurring-correction amount. In this integration process, on a predetermined cycle, an integration result $Y_n$ is obtained by adding a previous integration result $Y_{n-1}$ multiplied by an integral action coefficient K to a multiplication result $X_n$ of the multiplication unit 65, as indicated by the recursion formula (1).

$$Y_n = X_n + K \times Y_{n-1} = X_n + K \times \Sigma X_{n-1}$$ Formula (1)

In this formula, integral action coefficient K is equal to or less than 1 (K≤1).

When, for example, integration action coefficient K is 0.99, the integration result is decreased on a predetermined cycle by 1%, and the image-blurring-correction amount gradually approaches 0. Accordingly, the drive unit 4 gradually returns to the initial position. When integration action coefficient K is 1 (when complete integration is performed), the drive unit 4 does not return to the initial position; when integration action coefficient K is 0, the image-blurring-correction function itself is stopped.

The drive circuit 67 converts an image-blurring-correction amount that is an integration result of the integration unit 66 into a driving signal for the drive unit 4, and outputs the driving signal to the drive unit 4. As a result, the drive unit 4 is driven in accordance with the driving signal, thereby moving the image pickup element 3 in a direction such that the amount of movement of an image on an image plane is balanced out.

FIG. 3 illustrates exemplary effects of the blurring correction microcomputer 6 that are achieved when panning has been performed.

The upper side of FIG. 3 depicts, using a solid line, an exemplary temporal change in an angular velocity that is a processing result of the signal processing unit 61, and depicts, using a broken line, a temporal change in an angular velocity that is a processing result of the HPF 62 in the same situation.

In the example depicted on the upper side of FIG. 3, when panning has been started, the angular velocity that is a processing result of the signal processing unit 61 is deviated in one direction (positive direction). However, the angular velocity that is a processing result of the HPF 62 is attenuated by effects of the HPF 62, thereby approaching 0.

On the upper side of FIG. 3, "Limit 1 (th_$l_1$)" indicates a panning detection threshold (a threshold for the positive direction) used when the panning detection unit 63 detects panning. A threshold for the negative direction is not illustrated, and the only difference between the threshold for the negative direction and the threshold for the positive direction is the signs of those values. In this example, the angular velocity that is a processing result of the signal processing unit 61 exceeds "Limit 1 (th_$l_1$)" at time "$t_0$", and when this state continues for a period of "$P_1$" (until time "$t_2$" in this example), the panning detection unit 63 detects a start of panning. When the angular velocity that is a processing result of the signal processing unit 61 crosses zero (zero cross) at time "$t_3$", the panning detection unit 63 detects an end of the panning. Accordingly, a period of "$P_2$", i.e., a period from time "$t_2$" to time "$t_3$", is a period in which panning has been detected (panning-detected period).

While the panning detection unit 63 does not detect panning, "Limit 1 (th_$l_1$)" also serves as an upper limit value used when the limit unit 64 performs clip processing. A lower limit value is not illustrated, and the only difference between the lower limit value and the upper limit value is the signs of those values. When panning has not been detected, components that do not fall within a range extending from the lower limit value to the upper limit value are removed through clip processing from the angular velocity that is a processing result of the HPF 62, i.e., those components are removed from the components on which image blurring correction is to be applied. Hence, during the period before time "t2", in which panning is not detected, components "A" indicated by oblique lines are chosen as components to which image blurring correction is to be applied, and components "B" indicated as a shaded area are removed from the components to which image blurring correction is to be applied. Time "$t_1$" is the time at which the angular velocity that is a processing result of the HPF 62 exceeds the upper limit value for the first time after time "$t_0$".

On the upper side of FIG. 3, "Limit 2 (th_$l_2$)" indicates a limit value that is set only for an opposite direction from the panning direction when the limit unit 64 performs clip processing while the panning detection unit 63 has detected panning (during the panning-detected period). In this example, the direction of the panning detected by the panning detection unit 63 is the positive direction, and hence the limit value "Limit 2 (th_l$_2$)" is set in the negative direction. The panning direction is also a sign of the angular velocity that is a processing result of the signal processing unit 61 during the panning-detected period. As a result, during the panning-detected period, components less than "Limit 2 (th_l$_2$)" are removed thorough clip processing from the angular velocity that is a processing result of the HPF 62, i.e., those components are removed from the components to which image blurring correction is to be applied. Hence, during a period of "P$_2$" (panning-detected period), i.e., a period from time "t$_2$" to time "t$_3$", components "A" indicated by oblique lines are chosen as components to which image blurring correction is to be applied, and components "B" indicated as a shaded area are removed from the components to which image blurring correction is to be applied. Hence, while the panning velocity is being decreased before the panning is ended, the components less than "Limit 2(th_l$_2$)" do not undergo image blurring correction.

The center of FIG. 3 depicts, using a solid line, a temporal change in an image-blurring-correction amount (integration result of the integration unit 66) indicated when the limit unit 64 does not perform limit processing, in comparison with the temporal change in the angular velocity indicated on the upper side of FIG. 3 using a broken line (processing result of the HPF 62). The center of FIG. 3 also depicts, using a broken line, a temporal change in the amount of image blurring correction that is indicated when the limit unit 64 has performed limit processing. In this case, the integral action coefficient K given to the integration unit 66 is a value that is less than 1.

Due to effects of integration action coefficient K that are caused by operations of the integration unit 66, both of the image-blurring-correction amounts are decreased as time elapses, as depicted at the center of FIG. 3. In comparison with a situation in which limit processing is not performed, the image-blurring-correction amount is decreased when the limit unit 64 performs limit processing. The amount of variation in K×ΣX$_{n-1}$ is decreased in formula (1), thereby reducing the influence of integral action coefficient K.

The lower side of FIG. 3 depicts, using a solid line, a temporal change in the amount of movement of a video image (quantity of image movement vector) that is indicated when the limit unit 64 does not perform limit processing, in comparison with the temporal change in the angular velocity indicated using a broken line on the upper side of FIG. 3 (processing result of the HPF 62). The lower side also depicts, using a broken line, a temporal change in the amount of movement of a video image that is indicated when the limit unit 64 has performed limit processing.

Figure 13:
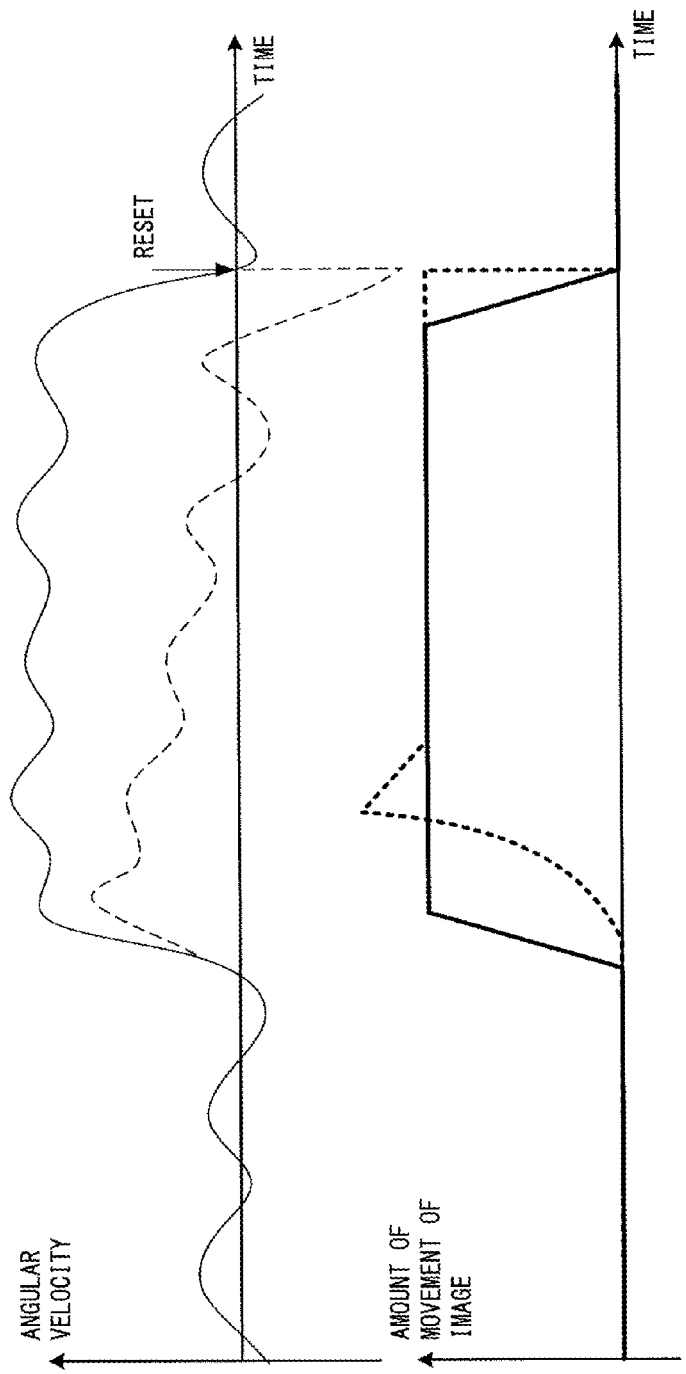
FIG. 13 depicts an exemplary temporal variation in an angular velocity of a camera detected when panning has been performed, and an exemplary temporal variation in the amount of movement of a video image captured by the camera (the quantity of image movement vector) in that situation (example 2)

When the limit unit 64 has performed limit processing, the effect of compensating for a decrease in the panning velocity that is caused by slowdown in the velocity of a camera action (effect of image blurring correction) is lessened as depicted in the lower side of FIG. 3. Hence, in comparison with the example depicted in FIG. 13, a rapid change is not seen in the amount of movement of an image at the end of panning.

Figure 4:
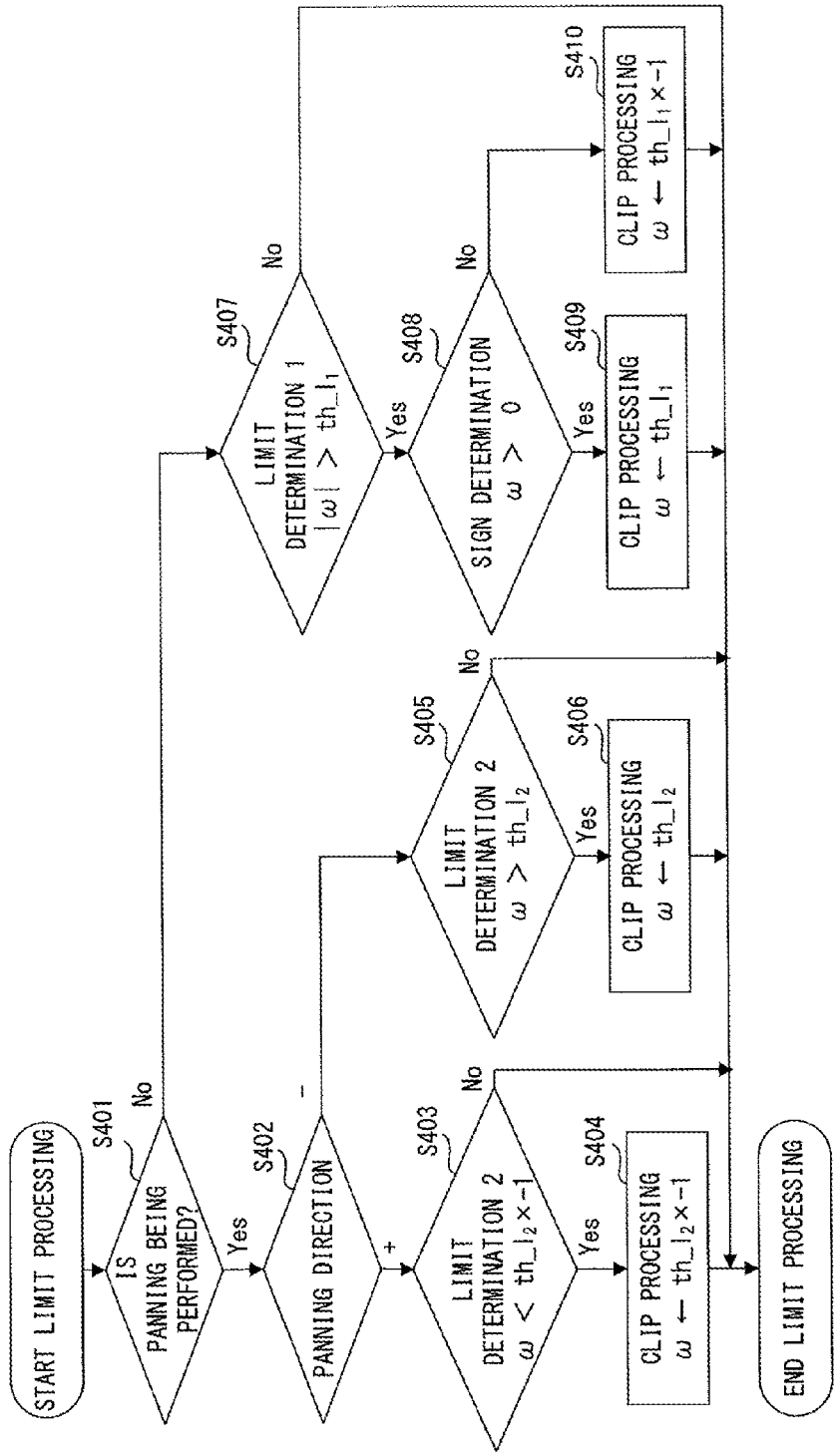
FIG. 4 is a flowchart indicating an example of limit processing performed on a predetermined cycle by a limit unit.

FIG. 4 is a flowchart indicating an example of limit processing performed by the limit unit 64 on a predetermined cycle.

As depicted in FIG. 4, the limit unit 64 determines whether panning is being performed (whether the process is in a panning-detected period) from a detection result of the panning detection unit 63 (S401).

When the result of the determination in S401 is Yes, the limit unit 64 determines whether a panning direction is a positive (+) direction or whether it is a negative (−) direction from the detection result of the panning detection unit 63 (S402).

When the result of the determination in S402 is the positive (+) direction, the limit unit 64 performs a limit determination 2 for the negative direction. More particularly, the limit unit determines whether an angular velocity (ω) that is a processing result of the HPF 62 is less than a limit value specific to the negative direction (th_l$_2$×−1) (S403).

When the result of the determination in S403 is Yes, the limit unit 64 sets the angular velocity (ω) that is a processing result of the HPF 62 to th_l$_2$×−1 through clip processing and outputs the set velocity (S404), and the limit processing is ended.

When the result of the determination in S403 is No, the limit unit 64 directly outputs the angular velocity (ω) that is a processing result of the HPF 62, and the limit processing is ended.

When the result of the determination in S402 is the negative (−) direction, the limit unit 64 performs a limit determination 2 for the positive direction. More particularly, the limit unit 64 determines whether the angular velocity (ω) that is a processing result of the HPF 62 has exceeded a limit value specific to the positive direction (th_l$_2$) (S405).

When the result of the determination in S405 is Yes, the limit unit 64 sets an angular velocity (ω) that is an output of the HPF 62 to th_l$_2$ through clip processing and outputs the set velocity (S406), and the limit processing is ended.

When the result of the determination in S405 is No, the limit unit 64 directly outputs the angular velocity (ω) that is a processing result of the HPF 62, and the limit processing is ended.

When the result of the determination in S401 is No, the limit unit 64 performs a limit determination 1. More particularly, the limit unit 64 determines whether the absolute value of the angular velocity (ω) that is the processing result of the HPF 62 has exceeded th_l$_1$ (S407).

When the result of the determination in S407 is Yes, the limit unit 64 performs a sign determination for the angular velocity (ω) that is the processing result of the HPF 62. More particularly, the limit unit 64 determines whether the angular velocity (ω) that is the processing result of the HPF 62 is greater than 0 (S408).

When the result of the determination in S408 is Yes, the limit unit 64 sets an angular velocity (ω) that is the processing result of the HPF 62 to th_l$_1$ through clip processing and outputs the set velocity (S409), and the limit processing is ended.

When the result of the determination in S408 is No, the limit unit 64 sets the angular velocity (ω) that is the processing result of the HPF 62 to th_l$_1$×−1 through clip processing and outputs the set velocity (S410), and the limit processing is ended.

When the result of the determination in S407 is No, the limit unit 64 directly outputs the angular velocity (ω) that is a processing result of the HPF 62, and the limit processing is ended.

Accordingly, the first embodiment may improve the response of a video image to camera work such as panning. The embodiment may decrease a feeling of wrongness that could be given to the photographer by a video image (a video image that was shot during panning) that has undergone image blurring correction.

The first embodiment may be varied as follows.

For example, the processes related to the limit determination 1 (S407-S410) may be removed from the limit processing depicted in FIG. 4. In this case, only a visual feeling of wrongness that the photographer could have regarding a video image at the time of ending panning is decreased.

For example, the th_l$_2$ used in the limit determination 2 in S403 and 405 may be a value that is variable within the range extending from 0 to a predetermined value. In this case, setting th_l$_2$ to a lower value decreases the likelihood of a video image at the time of ending panning giving a feeling of wrongness to the photographer. However, when the result of the determination in S403 or S405 is Yes due to slow panning, a th_l$_2$ that is a low value leads to a small image-blurring-correction amount, and hence the image blurring could possibly partially remain. In view of this fact, th_l$_2$ may be set to, for example, an angular velocity of about 2 degrees per second (dps). This will decrease a feeling of wrongness effectively when panning is ended, and eliminate the possibility of image blurring remaining frequently when slow panning is performed.

When th_l$_2$ is a value that is variable within the range extending from 0 to a predetermined value, a video image looks differently according to the usage state of the camera 1 and the focal length of the image shooting optical system 2. Hence, th_l$_2$ may be switched according to the usage state of the camera 1 or the focal length of the image shooting optical system 2. When, for example, the focal length of the image shooting optical system 2 is long, th_l$_2$ may be set to a lower value because the influence on image movement would be increased due to a large image-blurring-correction amount, in comparison with the case of shake of the camera 1 with a short focal length. As a result, the smaller image-blurring-correction amount leads to a decrease in the influence on the image movement, thereby more effectively decreasing a feeling of wrongness that could be given to the photographer when panning is ended.

Second Embodiment

The following describes a second embodiment of the invention. The second embodiment will be described only regarding differences from the first embodiment. In the second embodiment, like components are given like reference marks to those in the first embodiment, and descriptions of those components are omitted herein.

Figure 5:
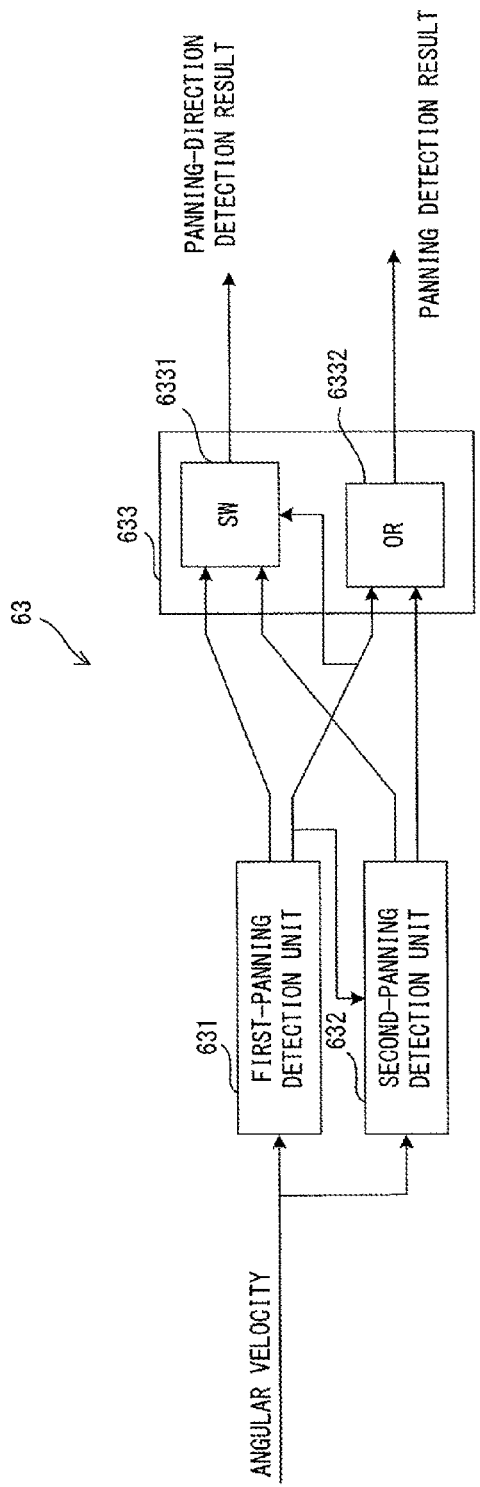
FIG. 5 illustrates an exemplary functional configuration of a panning detection unit in accordance with a second embodiment.

FIG. 5 illustrates an exemplary functional configuration of the panning detection unit 63 in accordance with the second embodiment.

As depicted in FIG. 5, the panning detection unit 63 in accordance with a second embodiment includes a first-panning detection unit 631, a second-panning detection unit 632, and a logic circuit 633.

The first-panning detection unit 631 detects first panning and a direction of the panning on the basis of an angular velocity that is a processing result of the signal processing unit 61, and outputs a first-panning detection result signal and a first-panning-direction detection result signal. More particularly, the first-panning detection unit 631 outputs a high-level signal as the first-panning detection result signal during the period extending from a moment at which a start of the first panning is detected to a moment at which an end of the first panning is detected (while the first panning has been detected), and outputs a low-level signal during the other periods. The first-panning detection unit 631 also outputs, as the first-panning-direction detection result signal, a high-level signal when a positive panning direction has been detected and a low-level signal when a negative panning direction has been detected. Details of the first-panning detection unit 631 will be described hereinafter with reference to FIG. 6.

The second-panning detection unit 632 detects second panning, which is slower than the first panning, and a direction of the panning on the basis of the angular velocity that is a processing result of the signal processing unit 61, and outputs a second-panning detection result signal and a second-panning-direction detection result signal. More particularly, the second-panning detection unit 632 outputs a logic signal of a high-level signal as the second-panning detection result signal during the period extending from a moment at which a start of the second panning is detected to a moment at which an end of the second panning is detected (while the second panning has been detected), and outputs a logic signal of a low-level signal during the other periods. However, when the first-panning detection result signal of the first-panning detection unit 631 is a high-level signal, the second-panning detection unit 632 outputs a low-level signal as the second-panning detection result signal. The second-panning detection unit 632 outputs, as the second-panning-direction detection result signal, a high-level signal when a positive panning direction has been detected, and a low-level signal when a negative panning direction has been detected. Details of the second-panning detection unit 632 will be described hereinafter with reference to FIG. 7.

The logic circuit 633 includes a selection circuit (SW) 6331 and an OR circuit 6332.

The selection circuit 6331 selects and outputs a panning-direction detection result signal of a panning detection unit that has detected panning from among the first-panning detection unit 631 and the second-panning detection unit 632. When both the first-panning detection unit 631 and the second-panning detection unit 632 have detected panning, higher priority is given to the direction detected by the first-panning detection unit 631. In particular, in accordance with a logical state that corresponds to the first-panning detection result signal output by the first-panning detection unit 631 as a logical state for switching, the selection circuit 6331 selects and outputs a panning-direction detection result signal of a panning detection unit that has detected panning from among the first-panning detection unit 631 and the second-panning detection unit 632. In the present embodiment, when the first-panning detection result signal input to the selection circuit 6331 is a low-level signal, the selection circuit 6331 determines that the second-panning detection unit 632 has detected the second panning, and selects and outputs the second-panning-direction detection result signal from the second-panning detection unit 632.

The OR circuit 6332 performs an OR operation (logical sum) on the first-panning detection result signal of the first-panning detection unit 631 and the second-panning detection result signal of the second-panning detection unit 632, and outputs the resultant operation result signal as a panning detection result of the panning detection unit 63 in accordance with the second embodiment. As a result, the panning detection unit 63 in accordance with the second embodiment detects panning when the first-panning detection unit 631 has detected the first panning, or when the second-panning detection unit 632 has detected the second panning.

Figure 6:
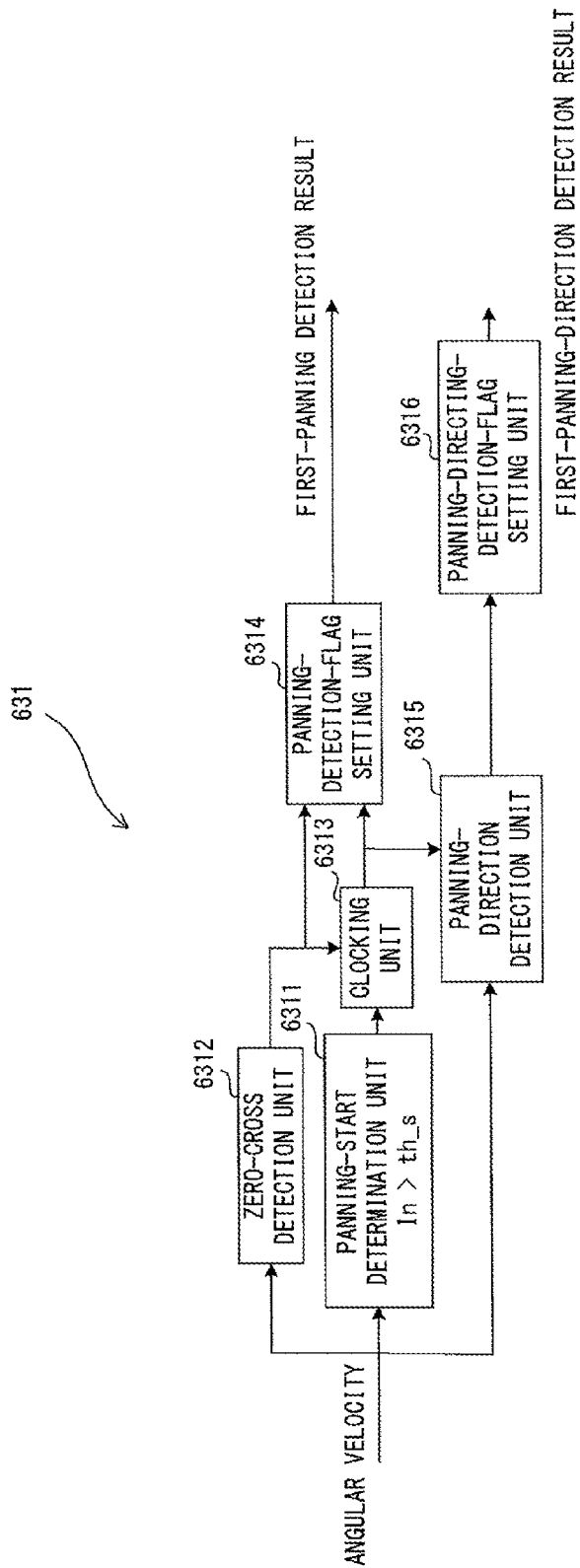
FIG. 6 illustrates an exemplary functional configuration of a first panning detection unit in accordance with a second embodiment.

FIG. 6 illustrates an exemplary functional configuration of the first-panning detection unit 631.

As depicted in FIG. 6, the first-panning detection unit 631 includes a panning-start determination unit 6311, a zero-cross detection unit 6312, a clocking unit 6313, a panningdetection-flag setting unit 6314, a panning-direction detection unit 6315, and a panning-direction-detection-flag setting unit 6316.

The panning-start determination unit 6311 determines the absolute value of an angular velocity that is a processing result of the signal processing unit 61, and determines whether this value has exceeded a panning-start-detection threshold (th_s).

The zero-cross detection unit 6312 detects zero cross for the angular velocity that is a processing result of the signal processing unit 61.

On the basis of the determination result of the panning-start determination unit 6311, the clocking unit 6313 counts a period in which the absolute value of the angular velocity that is a processing result of the signal processing unit 61 continuously exceeds the panning-start-detection threshold (th_s). When the count value has reached one that corresponds to a predetermined period (e.g., the period "$P_1$" depicted on the upper side of FIG. 3), it is determined that first panning has been started. However, when the absolute value of the angular velocity that is a processing result of the signal processing unit 61 does not exceed the panning-start-detection threshold (th_s), or when the zero-cross detection unit 6312 has detected zero cross, the clocking unit 6313 sets the count value to an initial value (count value=0).

The panning-detection-flag setting unit 6314 sets a panning detection flag when the clocking unit 6313 has determined that the first panning has been started, and clears the panning detection flag when the zero-cross detection unit 6312 has detected zero cross. It should be noted that setting the panning detection flag means setting the logical state of the panning detection flag to a high level and that clearing the panning detection flag means setting the logical state of the panning detection flag to a low level. This is also applicable to other types of flags. When the panning detection flag has been set, the panning-detection-flag setting unit 6314 outputs a logic signal of a high-level signal as the first-panning detection result signal. When the panning detection flag has been cleared, the panning-detection-flag setting unit 6314 outputs a logic signal of a low-level signal as the first-panning detection result signal.

When the clocking unit 6313 has determined that the first panning has been started, the panning-direction detection unit 6315 detects, as a direction of the first panning, a sign of the angular velocity that is a processing result of the signal processing unit 61 as of that moment.

When the direction detected by the panning-direction detection unit 6315 is positive, the panning-direction-detection-flag setting unit 6316 sets the panning-direction detection flag.

When the direction detected by the panning-direction detection unit 6315 is negative, the panning-direction-detection-flag setting unit 6316 clears the panning-direction detection flag. When the panning-direction-detection flag has been set, the panning-direction detection unit 6315 outputs a high-level signal as the first-panning-direction detection result signal. When the panning-direction-detection flag has been cleared, the panning-direction detection unit 6315 outputs a low-level signal as the first-panning-direction detection result signal.

Figure 7:
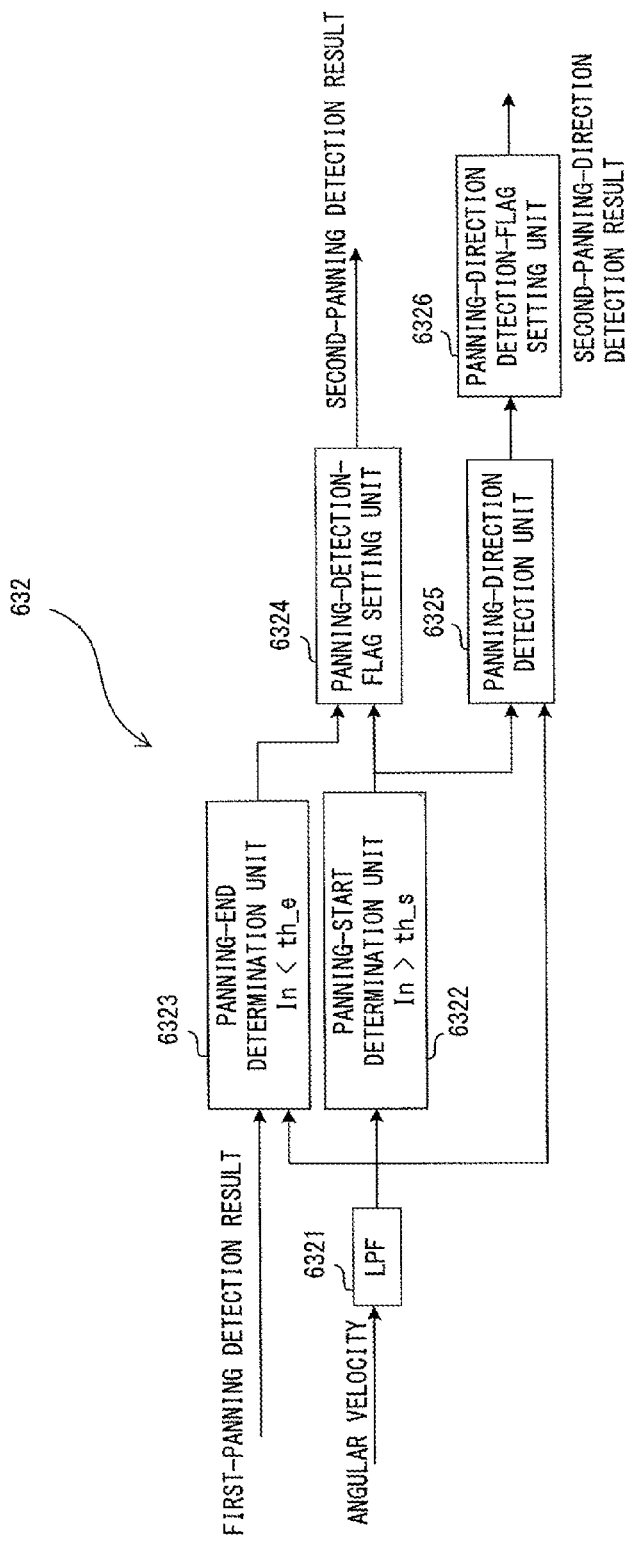
FIG. 7 illustrates an exemplary functional configuration of a second panning detection unit in accordance with a second embodiment.

FIG. 7 illustrates an exemplary functional configuration of the second-panning detection unit 632.

The second-panning detection unit 632 detects panning of a very low angular velocity of, for example, about 1 dps as second panning. Accordingly, the second-panning detection unit 632 includes components that apply low-pass-filter (LPF) processing for removing high frequency components to an angular velocity that is a processing result of the signal processing unit 61 and then determine a start and end of panning.

As depicted in FIG. 7, the second-panning detection unit 632 includes a LPF 6321, a panning-start determination unit 6322, a panning-end determination unit 6323, a panning-detection-flag setting unit 6324, a panning-direction detection unit 6325, and a panning-direction-detection-flag setting unit 6326.

The LPF 6321 applies processing of removing high frequency components (LPF processing) to an angular velocity that is a processing result of the signal processing unit 61. The LPF 6321 may be provided outside the second-panning detection unit 632.

The panning-start determination unit 6322 determines that second panning has been started when the absolute value of an angular velocity that is an output of the LPF 6321 has exceeded a panning-start-detection threshold (th_s).

When the absolute value of an angular velocity that is an output of the LPF 6321 is less than a panning-end-detection threshold (th_e), or when a first-panning detection result signal of the first-panning detection unit 631 is a high-level signal (when first panning has been detected), the panning-end determination unit 6323 determines that second panning has been ended. In this way, also in the latter situation, it is determined that second panning has been ended, and first panning is detected more preferentially than the second panning. This maintains the performance of the response of a captured video image not only to slow panning (second panning) but also to fast panning (first panning).

The panning-detection-flag setting unit 6324 sets a panning detection flag when the panning-start determination unit 6322 has determined that second panning has been started. Meanwhile, the panning-detection-flag setting unit 6324 clears the panning detection flag when the panning-end determination unit 6323 has determined that second panning has been ended. When the panning detection flag has been set, the panning-detection-flag setting unit 6324 outputs a high-level signal as a second-panning detection result signal. When the panning-detection flag has been cleared, the panning-detection-flag setting unit 6324 outputs a low-level signal as a second-panning detection result signal.

When the panning-start determination unit 6322 has determined that second panning has been started, the panning-direction detection unit 6325 detects, as a direction of the second panning, a sign of an angular velocity that is an output of the LPF 6321 as of that moment.

When the direction detected by the panning-direction detection unit 6325 is positive, the panning-direction-detection-flag setting unit 6326 sets the panning-direction detection flag. When the direction detected by the panning-direction detection unit 6325 is negative, the panning-direction-detection-flag setting unit 6326 clears the panning-direction detection flag. When the panning-direction-detection flag has been set, the panning-direction detection unit 6325 outputs a high-level signal as the second-panning-direction detection result signal. When the panning-direction-detection flag has been cleared, the panning-direction-detection-flag setting unit 6326 outputs a low-level signal as the second-panning-direction detection result signal.

When the second-panning detection unit 632 which has such a configuration attempts to detect panning of an angular velocity of, for example, 1 dps or greater, it is advantageous for the LPF 6321 to have a cut-off frequency of about 1 Hz as a frequency transfer characteristic. Detection thresholds for the respective times of the start and end of panning desirably have hysteresis; for example, the panning-startdetection threshold (th_s) may be set to 1 dps, and the panning-end-detection threshold (th_e) may be set to 0.5 dps.

The HPF 62 of the blurring correction microcomputer 6 in accordance with the second embodiment switches a cut-off frequency in accordance with a result of detection of panning performed by the panning detection unit 63 in accordance with the second embodiment. More particularly, when panning has not been detected, the HPF 62 switches the cut-off frequency to f1. When panning has been detected, the HPF 62 switches the cut-off frequency to f2 (f2>f1). Accordingly, the processing characteristics of the HPF 62 are changed according to a result of detection of panning performed by the panning detection unit 63 in accordance with the second embodiment. In particular, when panning has been detected, the change leads to a smaller image-blurring-correction amount than when panning is not detected.

The blurring correction microcomputer 6 in accordance with the second embodiment switches an integral action coefficient K to be provided to the integration unit 66, according to a result of detection of panning performed by the panning detection unit 63 in accordance with the second embodiment. More particularly, the integral action coefficient K is switched to k1 when panning has not been detected, and is switched to k2 (k2<k1) when panning has been detected. Accordingly, the processing characteristics of the integration unit 66 are changed according to a result of detection of panning performed by the panning detection unit 63 in accordance with the second embodiment; when panning has been detected, the change leads to a smaller image-blurring-correction amount than when panning is not detected.

Both the cut-off frequency and the integral action coefficient K do not necessarily need to be switched, but only one of them may be switched.

The second embodiment enables the performance of the response of a video image not only to slow panning (second panning) but also to fast panning (first panning) to be maintained.

Third Embodiment

The following describes a third embodiment of the invention. The third embodiment will be described only regarding differences from the first embodiment. In the third embodiment, like components are given like reference marks to those in the first embodiment, and descriptions of those components are omitted herein.

FIG. 8 illustrates an exemplary functional configuration of a blurring correction microcomputer 6 in accordance with a third embodiment.

As depicted in FIG. 8, in comparison with the blurring correction microcomputer 6 in accordance with the first embodiment depicted in FIG. 2, the blurring correction microcomputer 6 in accordance with the third embodiment further includes an amplitude determination unit 68.

On the basis of an angular velocity that is a processing result of the signal processing unit 61 for a period of time beginning at a predetermined time before (predetermined number of cycles before) the present time and extending up to the present time, the amplitude determination unit 68 changes a threshold for deciding an upper limit value and a lower limit value to be used when the limit unit 64 performs clip processing while panning has not been detected ("th_$l_1$" in S409 and S410 in FIG. 4). More particularly, on the basis of one of, or both, the maximum and minimum values of the angular velocity that is the processing result of the signal processing unit 61 which are reached during a period of time beginning at a predetermined time before the present time and extending up to the present time, the amplitude determination unit 68 obtains an amplitude value W of the angular velocity. For example, the absolute value of the maximum or minimum value of the angular velocity may be obtained as the amplitude value W. The amplitude value W multiplied by a predetermined scale factor (coefficient) α is set as a threshold (th_$l_1$) for deciding an upper limit value and a lower limit value to be used when the limit unit 64 performs clip processing while panning has not been detected.

The threshold (th_$l_1$) that is set as described above is equal to or less than a panning detection threshold (a panning detection threshold as an absolute value) used by the panning detection unit 63 to detect panning. The predetermined scale factor α is variable. For example, a longer focal length of the image shooting optical system 2 may lead to a smaller scale factor α.

Figure 9:
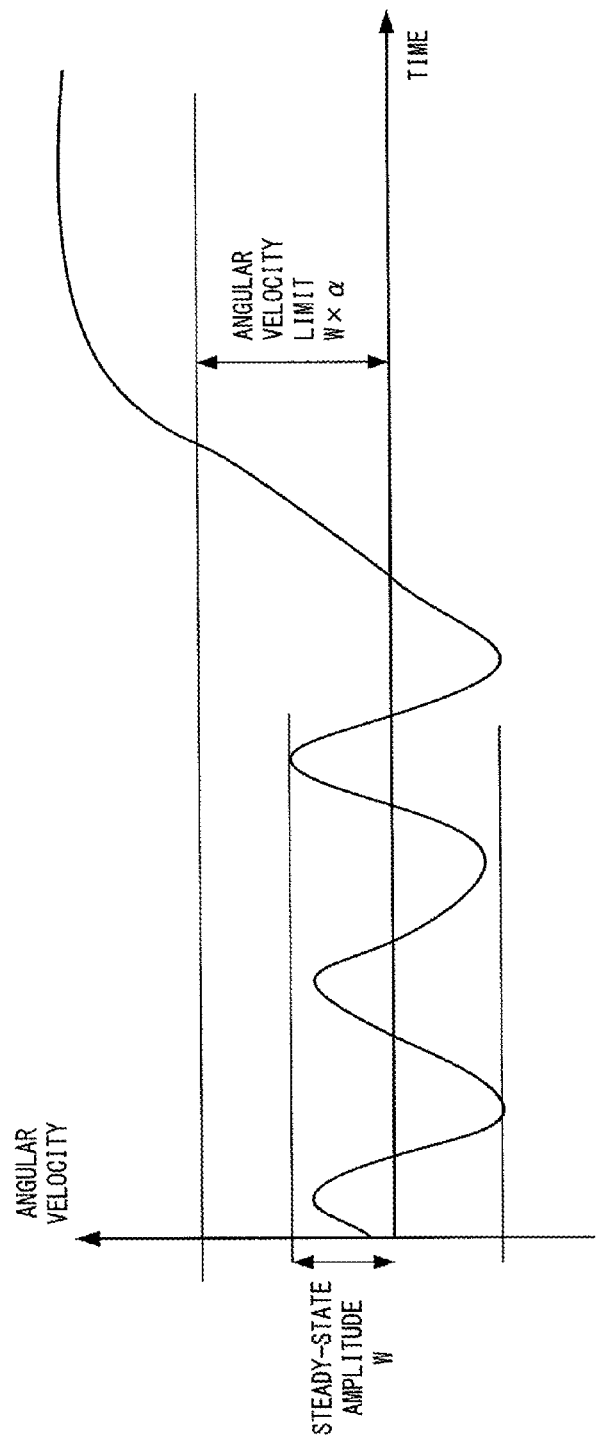
FIG. 9 illustrates an example of a threshold ($th\_l_1$) set by an amplitude determination unit.

FIG. 9 illustrates an example of a threshold (th_$l_1$) set by the amplitude determination unit 68.

In the example depicted in FIG. 9, the amplitude determination unit 68 obtains, as an amplitude value W, a maximum value of an angular velocity that is a processing result of the signal processing unit 61 which is reached during a period of time beginning at a predetermined time before the present time and extending up to the present time, and sets, as a threshold (th_$l_1$), the amplitude value W multiplied by a scale factor α, thereby providing an upper limit value of W×α.

Descriptions will be given of an exemplary situation in which a maximum value of the angular velocity reached during a period of time beginning 0.5 second before the present time and extending up to the present time is obtained as an amplitude value W, and the amplitude value W multiplied by 1.5 (α=1.5) is set as a threshold (th_$l_1$). In this situation, when no postural changes are made to the camera 1, the limit unit 64 does not limit an angular velocity that is a processing result of the HPF 62. However, when a postural change has been made to the camera 1, or when the photographer has switched framing, the limit unit 64 immediately limits the angular velocity that is a processing result of the HPF 62, thereby suppressing image blurring correction.

Accordingly, the threshold (th_$l_1$) is set to a low value when the camera 1 is rarely shaken, e.g., when the photographer tightly holds the camera 1. As a result, when panning has been performed, the absolute value of the angular velocity that is an output result of the HPF 62 quickly exceeds the threshold (th_$l_1$) upon the action of the camera 1, and the effect of suppressing image blurring correction is increased, thereby improving the response of a video image to the panning.

The threshold (th_$l_1$) is set to a high value when the camera 1 is shaken hard, e.g., when the photographer is walking or holding the camera 1 with one hand. As result, the absolute value of the angular velocity that is an output result of the HPF 62 exceeds the threshold (th_$l_1$) less frequently, and this can suppress the effect of limiting image blurring correction that is caused through limit processing performed by the limit unit 64, thereby preventing the performance of image blurring correction from being decreased.

The upper limit of the threshold (th_$l_1$) may be a panning detection threshold (a panning detection threshold as an absolute value) used by the panning detection unit 63 for detection of panning. In this case, the threshold ($th\_l_1$) is varied without exceeding the panning detection threshold. This may limit an image-blurring-correction amount calculated by a time at which the panning detection unit 63 detects panning.

As described above, in the third embodiment, when panning has not been detected, a threshold ($th\_l_1$) for deciding an upper limit value and lower limit value for clip processing performed by the limit unit 64 is changed according to a change in the posture of the camera 1 that is made immediately before the detection of panning. This allows the performance of image blurring correction to be prevented from being decreased due to the limit processing performed by the limit unit 64.

Fourth Embodiment

The following describes a fourth embodiment of the invention. The fourth embodiment will be described only regarding differences from the second embodiment. In the fourth embodiment, like components are given like reference marks to those in the second embodiment, and descriptions of those components are omitted herein.

The fourth embodiment is a variation of the second embodiment.

Regarding the panning detection unit 63 in accordance with the second embodiment (see FIG. 5), higher priority is given to the detection result of the first-panning detection unit 631 than the detection result of the second-panning detection unit 632. However, depending on a photographer or a scene for which image shooting is performed, the only panning that is performed may be slow panning (the second panning) or fast panning (the first panning). Accordingly, the panning detection unit 63 in accordance with the fourth embodiment has a function such that a detection result of one of the first-panning detection unit 631 or the second-panning detection unit 632 is used to make a selection as to whether to reset (initialize) the HPF 62 when panning has been ended.

Figure 10:
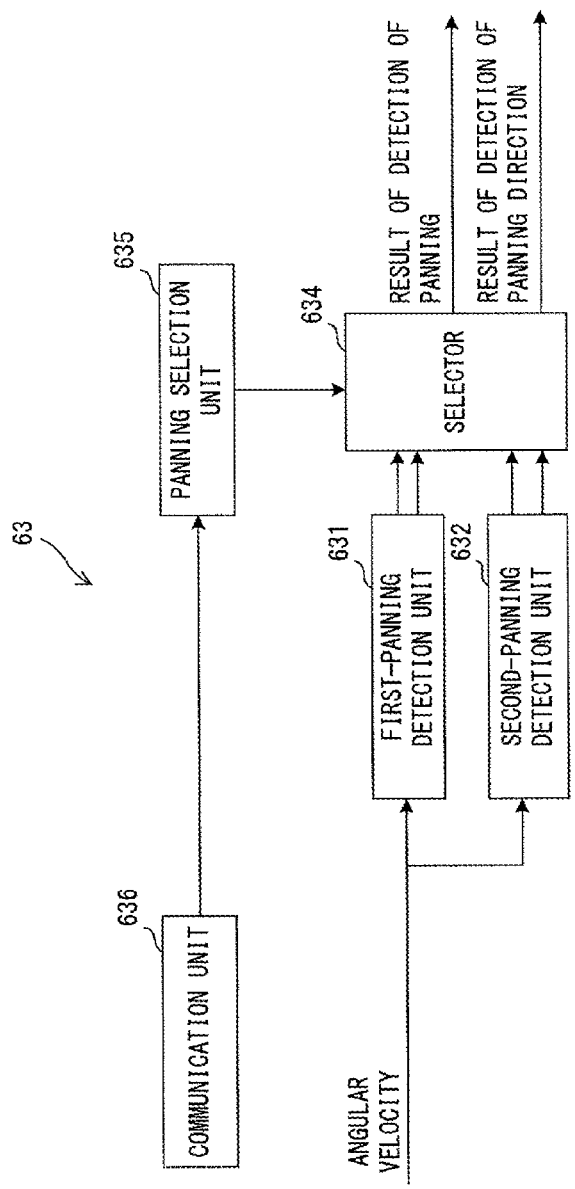
FIG. 10 illustrates an exemplary functional configuration of a panning detection unit in accordance with a fourth embodiment.
Figure 12:
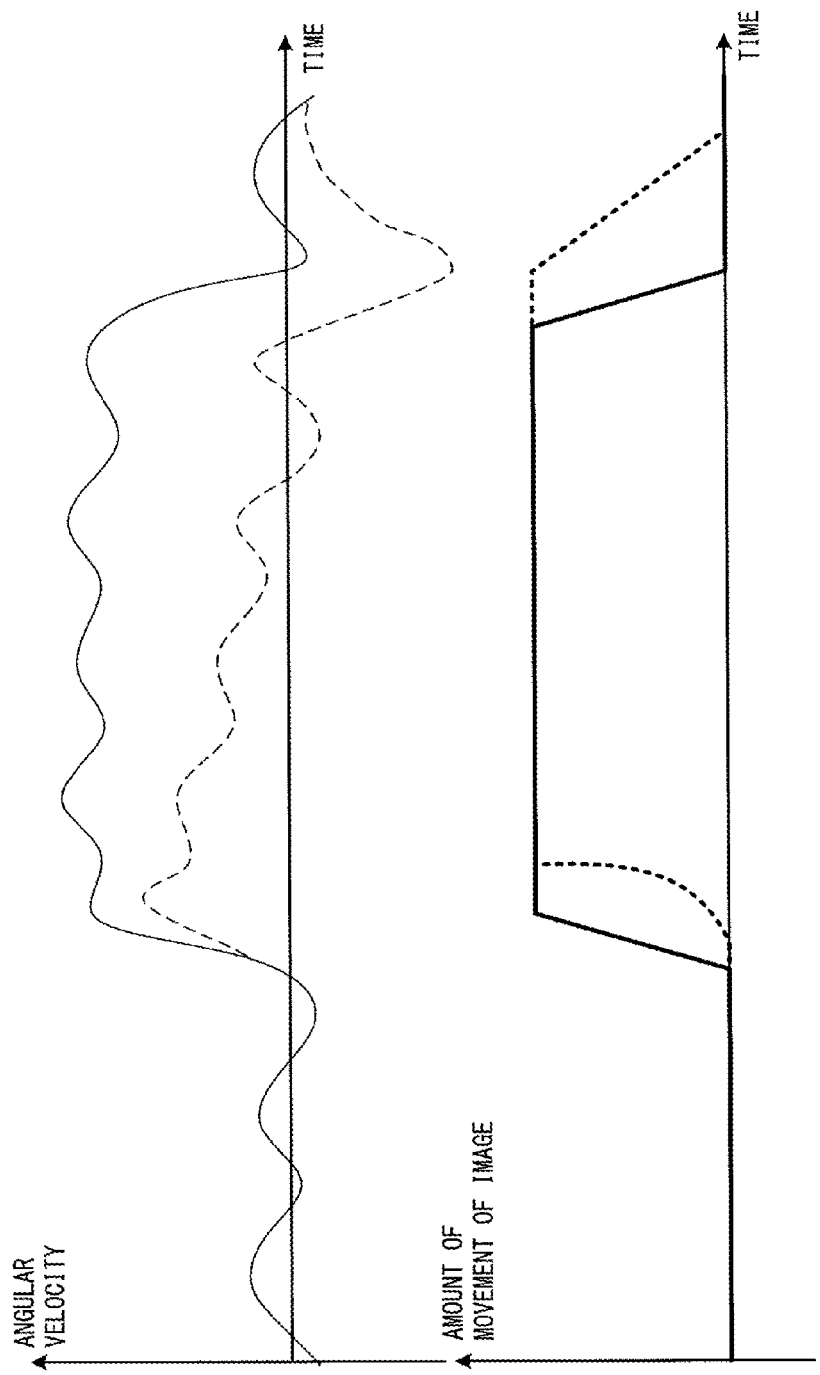
FIG. 12 depicts an exemplary temporal variation in an angular velocity of a camera detected when panning has been performed, and an exemplary temporal variation in the amount of movement of a video image captured by the camera (the quantity of image movement vector) in that situation (example 1)

FIG. 10 illustrates an exemplary functional configuration of the panning detection unit 63 in accordance with the fourth embodiment.

As depicted in FIG. 10, the panning detection unit 63 in accordance with the fourth embodiment includes a selector 634 in place of the logic circuit 633 depicted in FIG. 5, and further includes a panning selection unit 635 and a communication unit 636. In the configuration of the panning detection unit 63 in accordance with the fourth embodiment, a first-panning detection result signal of the first-panning detection unit 631 is not input to the second-panning detection unit 632.

The communication unit 636 communicates with the system controller 5. The communication unit 636 may be provided outside the panning detection unit 63.

On the basis of information reported from the system controller 5 via the communication unit 636, the panning selection unit 635 decides which of a detection result of the first-panning detection unit 631 or a detection result of the second-panning detection unit 632 is to be selected. The information reported from the system controller 5 is information on a movement vector (motion vector) detected from a video image and image-shooting conditions (e.g., image-shooting scene mode, exposure) that have been set for the camera 1. The movement vector is detected by the system controller 5.

For example, when slow panning is estimated to have been performed (e.g., when the camera 1 is moved slowly) from a movement vector detected from a video image, the panning selection unit 635 selects a detection result of the second-panning detection unit 632. For example, when the magnitude of a movement vector detected from a video image is less than a predetermined value, a detection result of the second-panning detection unit 632 may be selected. Meanwhile, when fast panning is estimated to have been performed (when a subject is frequently switched), a detection result of the first-panning detection unit 631 is selected. For example, when a variation (amount of change) in the magnitude of a movement vector detected from a video image is greater than a predetermined value, or when the magnitude of the movement vector is greater than a predetermined value, it may be highly likely that fast panning for chasing a subject has been performed. In this case, the panning selection unit 635 selects a detection result of the first-panning detection unit 631.

When, for example, the image-shooting scene mode is one suitable for shooting an image of a sport scene or a child, it is highly likely that fast panning for chasing a subject will be performed, and the panning selection unit 635 selects a detection result of the first-panning detection unit 631. Meanwhile, when the image-shooting scene mode is one suitable for shooting an image of landscape or nightscape, it is highly likely that slow panning will be performed. In this case, a detection result of the second-panning detection unit 632 is selected.

In accordance with the selection decision of the panning selection unit 635, the selector 634 performs switching to output a detection result of the first-panning detection unit 631 to the HPF 62 and the limit unit 64 or to output a detection result of the second-panning detection unit 632 to the HPF 62 and the limit unit 64. In particular, when the panning selection unit 635 has selected a detection result of the first-panning detection unit 631, the selector 634 outputs the detection result of the first-panning detection unit 631 to the HPF 62 and the limit unit 64. When the panning selection unit 635 has selected a detection result of the second-panning detection unit 632, the selector 634 outputs the detection result of the second-panning detection unit 632 to the HPF 62 and the limit unit 64.

As described above, in the fourth embodiment, on the basis of a panning detection result selected according to an image-shooting scene, the timing of resetting the HPF 62 is changed, and the limit unit 64 performs limit processing. This allows the camera 1 to perform image-blurring-correction control tailored to an image-shooting scene.

A variation of the forth embodiment is as follows.

For example, the system controller 5, instead of the panning selection unit 635, may make a decision as to which of the detection results of the first-panning detection unit 631 and the second-panning detection unit 632 is to be selected. In this case, in accordance with the selection decision of the system controller 5 that is reported via the communication unit 636 and the panning selection unit 635, the selector 634 outputs a detection result of the first-panning detection unit 631 to the HPF 62 and the limit unit 64. Alternatively, the selector 634 may perform switching to output a detection result of the second-panning detection unit 632 to the HPF 62 and the limit unit 64.

In such a situation, for example, the average of the angular velocities of panning performed in the past by the photographer or the ratio between fast panning (first panning) and slow panning (second panning) performed in the past by the photographer may be stored as image-shooting-history information in a nonvolatile memory (not illustrated) of the system controller 5. On the basis of the image-shootinghistory information, the system controller 5 may make a decision as to which of the detection results of the first-panning detection unit 631 and the second-panning detection unit 632 is to be selected. When the photographer performed in the past fast panning more frequently than slow panning, the detection result of the first-panning detection unit 631 is selected. When the photographer performed in the past slow panning more frequently than fast panning, the detection result of the second-panning detection unit 632 is selected. In video filming, the tendency (characteristics) of an occurrence of panning is likely to be different between photographers. Hence, image-blurring-correction control tailored to the photographer's image-shooting style (tendency of an occurrence of panning) can be performed by performing a selection decision of a detection result in accordance with image-shooting-history information.

Fifth Embodiment

The following describes a fifth embodiment of the invention. The fifth embodiment will be described only regarding differences from the third embodiment. In the fifth embodiment, like components are given like reference marks to those in the third embodiment, and descriptions of those components are omitted herein.

The fifth embodiment is a variation of the third embodiment.

FIG. 11 illustrates an exemplary functional configuration of the blurring correction microcomputer 6 in accordance with the fifth embodiment.

As depicted in FIG. 11, the blurring correction microcomputer 6 in accordance with the fifth embodiment includes a communication unit 69a and a limit decision unit 69b in place of the amplitude determination unit 68 depicted in FIG. 8.

The communication unit 69a communicates with the system controller 5.

On the basis of information reported from the system controller 5 via the communication unit 69a, the limit decision unit 69b decides a threshold for deciding an upper limit value and a lower limit value to be used when the limit unit 64 performs clip processing while panning is not detected ("$th\_l_1$" in S409 and S410 in FIG. 4). The information reported from the system controller 5 is information on a movement vector (motion vector) detected from a video image, an operational state of the camera 1 (e.g., a zoom change operation), or image-shooting conditions that have been set for the camera 1 (e.g., image-shooting scene mode). The movement vector is detected by the system controller 5.

When, for example, the magnitude of a movement vector detected from a video image is less than a predetermined value, the movement of the camera 1 is small, and hence the limit decision unit 69b sets a low value as the threshold ($th\_l_1$).

While, for example, the photographer is operating the camera 1 (e.g., while a zoom change operation is being performed), the camera 1 tends to be shaken hard, and hence the limit decision unit 69b sets a high value as the threshold ($th\_l_1$).

When, for example, the image-shooting scene mode is suitable for shooting an image of a sport scene or a child, the limit decision unit 69b sets a low value as the threshold ($th\_l_1$) to improve the response of a video image to camera work. When, for example, the image-shooting scene mode is suitable for shooting an image of landscape or nightscape, the camera 1 is not frequently moved, and hence a low value is set as the threshold ($th\_l_1$).

Accordingly, in the fifth embodiment, the limit unit 64 performs limit processing using a threshold ($th\_l_1$) that depends on an image-shooting scene or the operational state the camera 1. This enables image-blurring-correction control tailored to an image-shooting scene or the operational state of the camera 1 to be performed.

The following is a possible variation of the fifth embodiment.

For example, the photographer may have stored shake information related to shake of the camera 1 in past image shooting as image-shooting-history information in a nonvolatile memory (not illustrated) of the system controller 5. The limit decision unit 69b may determine whether the camera has been shaken hard by referring to the shake information, and may set a threshold ($th\_l_1$) according to the determination result. The shake information is, for example, information on a peak value of the amount of shake of the camera 1 during image shooting and an average amount of shake.

As a result, a threshold ($th\_l_1$) suitable for the photographer can be set. This can prevent a threshold ($th\_l_1$) unsuitable for the photographer from being set, which would give the photographer the impression that the image-blurring-correction function for a captured video image has been degraded.

In the configuration of the embodiments described above, the camera 1 corrects image blurring by moving the image pickup element 3 onto a plane orthogonal to an optical axis of the image shooting optical system 2. However, the invention is not limited to this configuration and may have, for example, a configuration in which image blurring is corrected by moving the lens included in the image shooting optical system 2 onto a plane orthogonal to the optical axis. Alternatively, both of the configurations may be provided to correct image blurring by using them in cooperation with each other.

The camera 1 may be a lens-integrated camera or may be an interchangeable lens camera. Alternatively, the camera 1 may be formed as a portable information terminal apparatus with a camera function, e.g., Smartphone® or a tablet.

As described above, the disclosed embodiments (including variations thereof) provide the advantage of enabling a stable panning video image to be obtained to prevent the operability for the photographer from being lost.

The present invention is not limited to the exact embodiments described above and may be embodied in a practical phase by making changes to the components without departing from the spirit of the invention. In addition, various inventions may be formed by combining, as appropriate, a plurality of components disclosed in the described embodiments. For example, some of the components indicated in a certain embodiment may be omitted. Moreover, components from different embodiments may be combined as appropriate.

The following appendixes are further disclosed for the embodiments.

(Appendix 1)

An image blurring correction method for an image blurring correction apparatus, the image blurring correction method including:

detecting an angular velocity of an apparatus;

detecting panning on the basis of the angular velocity;

performing high-pass filter (HPF) processing on the angular velocity, the HPF processing being processing for removing low frequency components;

performing clip processing on a processing result of the HPF processing on the basis of a result of the detection of panning;

calculating an image-blurring-correction amount on the basis of a processing result of the clip processing; and driving an image-blurring-correction mechanism on the basis of the image-blurring-correction amount, wherein when the panning is detected, the clip processing is performed under a condition in which a threshold that has a sign that corresponds to an opposite direction from a direction of the panning is defined as a limit value for the processing result of the HPF processing, and when an end of the panning is detected, the HPF processing is initialized.

(Appendix 2)

An image blurring correction method for an image blurring correction apparatus, the image blurring correction method including:

detecting an angular velocity of an apparatus;

detecting panning on the basis of the angular velocity;

performing high-pass filter (HPF) processing on the angular velocity, deciding an upper limit value and a lower limit value for a processing result of the HPF processing;

performing clip processing on a processing result of the HPF processing on the basis of a detection result of the panning, the upper limit value, and the lower limit value;

calculating an image-blurring-correction amount on the basis of a processing result of the clip processing; and driving an image-blurring-correction mechanism on the basis of the image-blurring-correction amount, wherein when the panning is not detected, the clip processing is performed using the upper limit value and the lower limit value.

What is claimed is:

1. An image blurring correction apparatus comprising:
an angular-velocity sensor that detects an angular velocity of the image blurring correction apparatus; and
a processor comprising:
  a first-panning detection section that detects first panning on the basis of the angular velocity,
  a low-pass-filter (LPF) processing section that performs LPF processing on the angular velocity,
  a second-panning detection section that detects second panning that has a panning velocity that is lower than that of the first panning on the basis of a processing result of the LPF processing section,
  a high-pass-filter (HPF) processing section that performs HPF processing on the angular velocity,
  a calculation section that calculates an image-blurring-correction amount on the basis of a detection result of the first-panning detection section or a detection result of the second-panning detection section, and a processing result of the HPF processing section, and
  a drive circuit that drives an image-blurring-correction mechanism on the basis of the image-blurring-correction amount,
when the first-panning detection section has detected the first panning, or when the second-panning detection section has detected the second panning, the processor changes one of, or both, a characteristic of the HPF processing section and a characteristic of the calculation section in such a manner as to decrease the image-blurring-correction amount.

2. The image blurring correction apparatus of claim 1, wherein when the first-panning detection section has detected the first panning, or when the second-panning detection section has detected the second panning, the processor increases a cutoff frequency specific to the HPF processing section and/or decreases a coefficient that is multiplied when the calculation section calculates the image-blurring-correction amount.

3. The image blurring correction apparatus of claim 1, wherein when the first panning detection section has detected the first panning, the processor invalidates the detection result of the second panning detection section.

4. The image blurring correction apparatus of claim 1, wherein the processor further includes a selection section that selects the detection result of the first panning detection section or the detection result of the second panning detection section, and the calculation section calculates the image-blurring-correction amount on the basis of the processing result of the HPF processing section, and the detection result of the first panning detection section or the detection result of the second panning detection section that has been selected by the selection section.

5. The image blurring correction apparatus of claim 4, wherein the apparatus is an imaging apparatus, and the selection section performs the selecting on the basis of at least one of an image-shooting condition of the imaging apparatus, a movement vector detected from a video image signal of the imaging apparatus, and past-image-shooting-history information of the imaging apparatus.

6. The image blurring correction apparatus of claim 5, wherein when an image-shooting condition suitable for shooting an image of a sport scene or a child is set as the image-shooting condition, the selection section selects the detection result of the first panning detection section, and when an image-shooting condition suitable for shooting an image of landscape or nightscape is set as the image-shooting condition, the selection section selects the detection result of the second panning detection section.

7. The image blurring correction apparatus of claim 5, wherein when a magnitude of the movement vector is greater than a predetermined value, the selection section selects the detection result of the first panning detection section, and when the magnitude of the movement vector is less than the predetermined value, the selection section selects the detection result of the second panning detection section.

8. An imaging apparatus comprising:
the image blurring correction apparatus of claim 1.

9. The image blurring correction apparatus of claim 1, further comprising:
a limit section that performs clip processing on the processing result of the HPF processing section on the basis of the detection result of the first panning detection section, and
a calculation section that calculates an image-blurring-correction amount on the basis of a processing result of the limit section, wherein when the first panning detection section detects the first panning, the limit section performs the clip processing under a condition in which a threshold that has a sign that corresponds to an opposite direction from a direction of the first panning is defined as a limit value for the processing result of the HPF processing section, and when the panning detection section detects an end of the first panning, the HPF processing section is initialized.

10. The image blurring correction apparatus of claim 9, wherein the first panning detection section includes:
a determination section that determines whether an absolute value of the angular velocity exceeds a panning detection threshold,
a clocking section that measures, on the basis of a determination result of the determination section, a time period during which the absolute value of the angular velocity continues to be higher than the panning detection threshold, and
a sign detection section that detects a sign of the angular velocity, and when the time period measured by the clocking section is longer than a predetermined time period, the panning detection section detects the first panning and detects, as the direction of the first panning, the sign detected at that time by the sign detection section.

11. The image blurring correction apparatus of claim 9, wherein an absolute value of the threshold defined as the limit value is variable.

12. The image blurring correction apparatus of claim 11, wherein as a focal length of an optical system of the apparatus becomes greater, the absolute value of the threshold defined as the limit value becomes lower.

13. An imaging apparatus comprising:
the image blurring correction apparatus of claim 9.

14. An image blurring correction method for an image blurring correction apparatus, the image blurring correction method comprising:
detecting an angular velocity of the image blurring correction apparatus;
detecting first panning on the basis of the angular velocity;
performing low-pass-filter (LPF) processing on the angular velocity;
detecting second panning that has a panning velocity that is lower than that of the first panning on the basis of a processing result of the LPF processing;
performing high-pass-filter (HPF) processing on the angular velocity;
calculating an image-blurring-correction amount on the basis of a result of the detection of the first panning or a result of the detection of the second panning, and a processing result of the HPF processing; and
driving an image-blurring-correction mechanism on the basis of the image-blurring-correction amount, wherein
when the first panning has been detected, or when the second panning has been detected, one of, or both, a characteristic of the HPF processing and a characteristic of the calculating of the image-blurring-correction amount is changed in such a manner as to decrease the image-blurring-correction amount.

15. An image blurring correction apparatus comprising:
an angular-velocity sensor that detects an angular velocity of the image blurring correction apparatus; and a processor configured to:
detect first panning on the basis of the angular velocity,
perform low-pass-filter (LPF) processing on the angular velocity,
detect second panning that has a panning velocity that is lower than that of the first panning on the basis of a processing result of the LPF processing,
perform high-pass-filter (HPF) processing on the angular velocity, and
calculate an image-blurring-correction amount on the basis of a detection result of the first-panning or a detection result of the second-panning, and a processing result of the HPF processing, and
the processor further comprises a drive circuit that drives an image-blurring-correction mechanism on the basis of the image-blurring-correction amount, wherein
when the processor detects the first panning, or when the processor detects the second panning, the processor changes one of, or both, a characteristic of the HPF processing and a characteristic of the image-blurring-correction amount in such a manner as to decrease the image-blurring-correction amount.

16. The image blurring correction apparatus of claim 15, wherein when the processor detects the first panning, or when the processor detects the second panning, the processor increases a cutoff frequency specific to the HPF processing and/or decreases a coefficient that is multiplied when the image-blurring-correction amount is calculated.

17. The image blurring correction apparatus of claim 15, wherein when the processor detects the first panning, the processor invalidates the detection result of the second panning.

18. The image blurring correction apparatus of claim 15, wherein the processor further selects the detection result of the first panning or the detection result of the second panning, and
the processor calculates the image-blurring-correction amount on the basis of the processing result of the HPF processing, and the detection result of the first panning or the detection result of the second panning that has been selected.

19. The image blurring correction apparatus of claim 18, wherein the apparatus is an imaging apparatus, and
the processor performs the selecting on the basis of at least one of an image-shooting condition of the imaging apparatus, a movement vector detected from a video image signal of the imaging apparatus, and past-image-shooting-history information of the imaging apparatus.

20. The image blurring correction apparatus of claim 19, wherein when an image-shooting condition suitable for shooting an image of a sport scene or a child is set as the image-shooting condition, the processor selects the detection result of the first panning, and
when an image-shooting condition suitable for shooting an image of landscape or nightscape is set as the image-shooting condition, the processor selects the detection result of the second panning.

21. The image blurring correction apparatus of claim 19, wherein when a magnitude of the movement vector is greater than a predetermined value, the processor selects the detection result of the first panning, and when the magnitude of the movement vector is less than the predetermined value, the processor selects the detection result of the second panning.

22. An imaging apparatus comprising:
the image blurring correction apparatus of claim 15.

23. The image blurring correction apparatus of claim 15, wherein
the processor is further configured to:
perform clip processing on the processing result of the HPF processing on the basis of the detection result of the first panning, and
calculate the image-blurring-correction amount on the basis of a processing result of the clip processing, wherein
when the processor detects the first panning, the processor performs the clip processing under a condition in which a threshold that has a sign that corresponds to an opposite direction from a direction of the first panning is defined as a limit value for the processing result of the HPF processing, and
when the processor detects an end of the first panning, the processor initializes the HPF processing.

\* \* \* \* \*